(12) United States Patent
Ki et al.

(10) Patent No.: US 12,399,656 B2
(45) Date of Patent: *Aug. 26, 2025

(54) NETWORK STORAGE GATEWAY

(71) Applicant: Samsung Electronics Co., Ltd., Suwon-si (KR)

(72) Inventors: Yang Seok Ki, Palo Alto, CA (US); Yangwook Kang, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,241

(22) Filed: Aug. 7, 2023

(65) Prior Publication Data

US 2023/0384982 A1 Nov. 30, 2023

Related U.S. Application Data

(63) Continuation of application No. 17/589,886, filed on Jan. 31, 2022, now Pat. No. 11,755,254, which is a continuation of application No. 16/846,256, filed on Apr. 10, 2020, now Pat. No. 11,256,448.

(60) Provisional application No. 62/948,794, filed on Dec. 16, 2019.

(51) Int. Cl.
*G06F 3/06* (2006.01)
*G06F 13/42* (2006.01)

(52) U.S. Cl.
CPC .......... *G06F 3/0679* (2013.01); *G06F 3/0613* (2013.01); *G06F 3/0659* (2013.01); *G06F 13/4282* (2013.01); *G06F 2213/0026* (2013.01)

(58) Field of Classification Search
CPC .... G06F 3/0679; G06F 3/0659; G06F 3/0613; G06F 2213/0026; G06F 2213/28; G06F 2213/2802; G06F 2213/2804
See application file for complete search history.

(56) References Cited

U.S. PATENT DOCUMENTS

| | | |
|---|---|---|
| 7,185,062 B2 | 2/2007 | Lolayekar et al. |
| 8,601,211 B2 | 12/2013 | Flynn et al. |
| 8,996,781 B2 | 3/2015 | Schuette et al. |
| 9,285,995 B2 | 3/2016 | Malwankar |
| 9,430,412 B2 | 8/2016 | Huang |
| 10,019,362 B1 | 7/2018 | Chatterjee et al. |
| 11,256,488 B1 | 2/2022 | Elango et al. |
| 11,755,254 B2 * | 9/2023 | Ki ............ G06F 13/387 710/308 |
| 2005/0201394 A1 | 9/2005 | Wang et al. |
| 2007/0038833 A1 | 2/2007 | Yamamoto et al. |

(Continued)

OTHER PUBLICATIONS

Notice of Allowance for U.S. Appl. No. 16/846,256, mailed Oct. 14, 2021.

(Continued)

*Primary Examiner* — Raymond N Phan
(74) *Attorney, Agent, or Firm* — Renaissance IP Law Group LLP

(57) ABSTRACT

A Solid State Drive (SSD) is disclosed. The SSD may include ports to receive requests from a host and to send requests to a second storage device. The SSD may include flash storage for data. An SSD controller may process the requests received from the host and generate the requests sent to the second storage device. The SSD may act as a cache for the second storage device.

18 Claims, 17 Drawing Sheets

(56) References Cited

U.S. PATENT DOCUMENTS

| | | |
|---|---|---|
| 2008/0313364 A1 | 12/2008 | Flynn et al. |
| 2009/0210620 A1 | 8/2009 | Jibbe et al. |
| 2013/0086300 A1 | 4/2013 | Luca |
| 2015/0067353 A1 | 3/2015 | Hui |
| 2015/0160862 A1* | 6/2015 | Blott .................... G06F 3/0683 711/148 |
| 2015/0254003 A1 | 9/2015 | Lee et al. |
| 2017/0091042 A1 | 3/2017 | Chou et al. |
| 2017/0271030 A1 | 9/2017 | Li |
| 2017/0286170 A1 | 10/2017 | De et al. |
| 2017/0329640 A1 | 11/2017 | Bandic et al. |
| 2018/0285019 A1 | 10/2018 | Olarig et al. |
| 2018/0307650 A1 | 10/2018 | Kachare et al. |
| 2019/0109720 A1 | 4/2019 | Olarig |
| 2019/0141128 A1 | 5/2019 | Hallak et al. |
| 2019/0146675 A1 | 5/2019 | Subramanian et al. |
| 2019/0199690 A1 | 6/2019 | Klein |
| 2019/0272245 A1 | 9/2019 | Olarig et al. |
| 2019/0278507 A1 | 9/2019 | Du et al. |
| 2020/0334292 A1* | 10/2020 | Ganeshan ............. G06F 3/0679 |

OTHER PUBLICATIONS

Notice of Allowance for U.S. Appl. No. 17/589,886, mailed Apr. 27, 2023.
Office Action for U.S. Appl. No. 16/846,256, mailed Apr. 29, 2021.
Office Action for U.S. Appl. No. 17/589,886, mailed Oct. 14, 2022.

* cited by examiner

NETWORK STORAGE GATEWAY

RELATED APPLICATION DATA

This application is a continuation of U.S. patent application Ser. No. 17/589,886, filed Jan. 31, 2022, now allowed, which is a continuation of U.S. patent application Ser. No. 16/846,256, filed Apr. 10, 2020, now U.S. Pat. No. 11,256, 448, issued Feb. 22, 2022, which claims the benefit of U.S. Provisional Patent Application Ser. No. 62/948,794, filed Dec. 16, 2019, all of which are incorporated by reference herein for all purposes.

FIELD

The inventive concepts relate generally to storage systems, and more particularly to storage systems that avoid bottlenecks in CPU and memory.

BACKGROUND

Accessing data stored on storage devices in an efficient manner is becoming increasingly important. Storage devices are increasing in size, the amount of data stored on storage devices is also increasing, and therefore it becomes even more important to efficiently process and use this data.

While historically storage has been handled separately from computing, with dedicated servers just for storage (and separate from computing servers), this arrangement has a potential bottleneck in the transmission of data between the computing servers and the storage servers. Thus, there has been a move to converge the computing server and the storage server into a single unit. But in a converged system, the central processing unit (CPU) becomes a bottleneck, which may slow down overall operations.

A need remains to improve storage systems that avoid bottlenecks in CPU and memory.

DETAILED DESCRIPTION

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Figure 1:
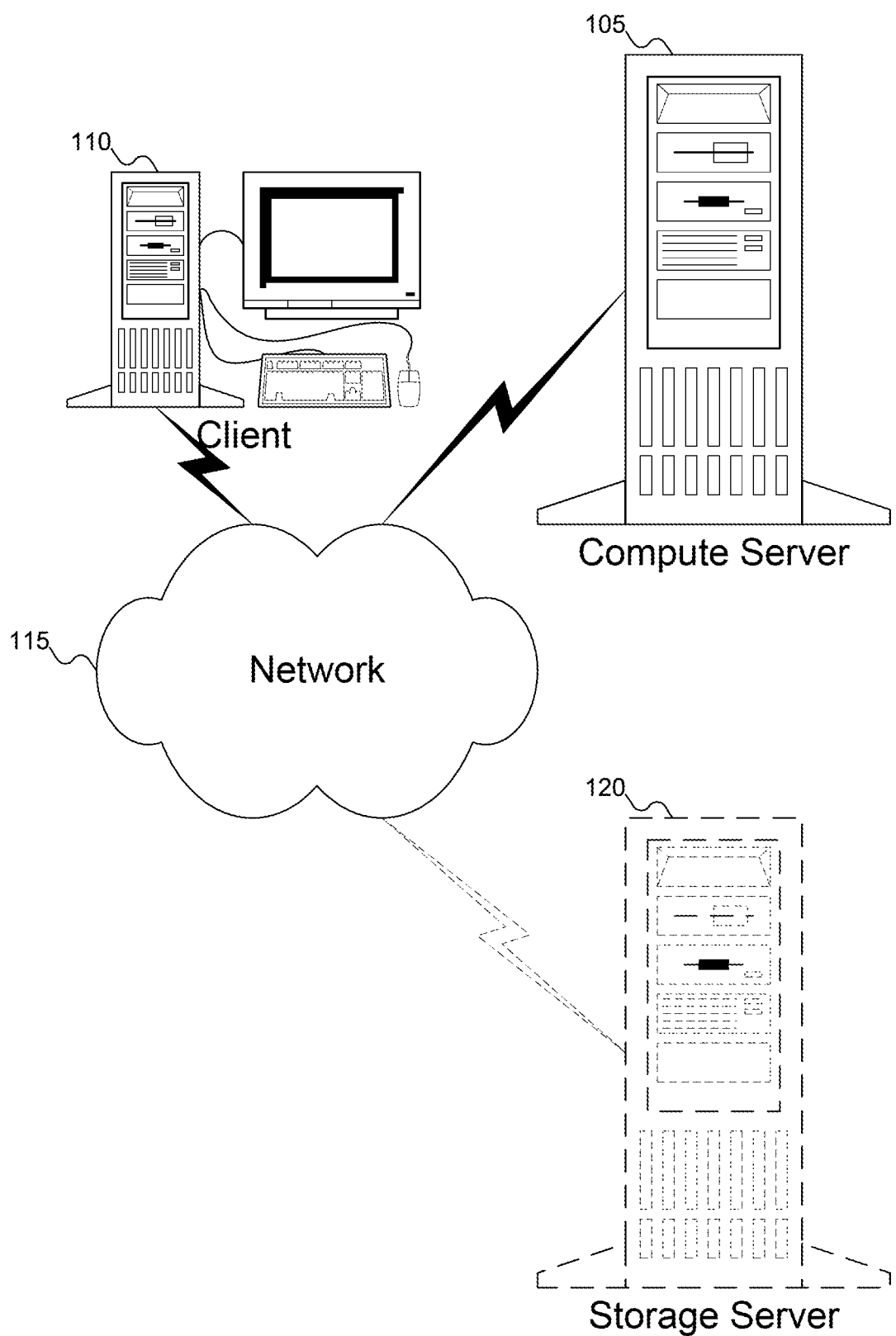
FIG. 1 shows a system including a compute server and a storage server, according to an embodiment of the inventive concept.

The progression of technologies to be able to store and process data as data increases is expected to move through several variations, as shown in FIG. 1 below, with each variation solving some problems but potentially introducing new ones.

A converged infrastructure puts everything—CPU, memory, cache, and storage devices all in the same box. This infrastructure has the advantage that with everything consolidated in a single box, it is easy to migrate both machine and data: there is no concern that, for example, the data might be left behind when the machine is migrated.

But the converged infrastructure has two problems. First, the CPU is very busy. Aside from executing commands associated with the operating system and applications, the CPU must also execute software commands to manage accessing data from the storage devices.

The second problem is that there is a limit to the number of SSDs that may be used in a converged infrastructure. A socket on the machine may only support up to 4 SSDs. Given that a typical machine only has two sockets, the machine itself may only support up to eight SSDs. As data grows, this number of SSDs may be insufficient for future needs.

A solution to the problems of the converged infrastructure is to disaggregate computing and storage. In a disaggregated infrastructure, the storage devices are again housed in a storage server rather than being integrated into the box with the computing server. The computing server and the storage server may then communicate over a network, such as using Ethernet protocol.

This infrastructure reduces the burden on the CPU, as it no longer has to handle communicating with the storage devices. This infrastructure also permits higher numbers of storage devices: 24, 36, or potentially more storage devices may be stored in a single storage server, thus overcoming the limit on the number of storage devices supported by the converged infrastructure.

But the CPU is still busy handling the operating system and executing instructions for various applications, so the CPU burden is only reduced, it is not eliminated as a possible bottleneck. If too many applications are requesting services from the CPU, the CPU may still be a potential bottleneck. In addition, when Peripheral Component Interconnect Express (PCIe) Gen 5 becomes standard, storage devices using PCIe Gen 5 will be able to send and receive data at a rate of 400 GB/second: faster than memory can process data. Thus, the memory in the storage server may be a bottleneck.

To address the potential problems of the disaggregated infrastructure, further modifications may be introduced. In a third architecture, the storage devices may be replaced with Ethernet SSDs, permitting remote access of the storage devices from the CPU. This change avoids the problem of memory becoming a bottleneck. But since this third architecture places responsibility for managing data read and writes back on the CPU, the CPU is once again burdened and may be a bottleneck, just as in the converged infrastructure. Further, because the storage devices are accessed remotely over a network, this third architecture may introduce latency issues in communications between the CPU and the storage devices.

Using a cache in this third architecture may both help and hinder operations. The cache may be able to provide data in a read request more quickly than a remote access to the Ethernet SSDs. But the cache must also be accessed when writing data, resulting in write requests that may make two or three hops to reach the SSD, rather than a more direct route, again impacting latency.

To address the problems of this third architecture, an SSD with some compute processing capability may be used to the compute server in a fourth architecture. This SSD effectively becomes the cache of the compute server. This SSD, which may include a storage-related processing unit (SPU), may handle storage management, freeing the CPU of that burden. The SPU may also handle data-related commands, such as acceleration, compression, encryption, etc. Overhead may be further reduced by replacing block SSDs with key-value (KV) SSDs in the storage server. This fourth architecture avoids any problems arising from memory bottlenecks or latency, and reduces the burden on the CPU (although the burden is not entirely eliminated, since the CPU still executes instructions from applications). Other downsides to this fourth architecture include that the caches (if there are more than one) do not communicate with each other, and that the SPU is typically not as powerful as a CPU (and so may not necessarily be able to execute every instruction like a CPU, or may not be able to execute instructions as efficiently as a CPU.

To address the problems with the fourth architecture, a fifth architecture may be used. In this fifth architecture the cache SSDs are enhanced with general data processing units (DPUs) that may operate similarly to the CPU. With the caches including DPUs, some or all of the applications may be shifted to the DPUs on the cache SSDs, freeing the host CPU to handle other tasks and eliminating the potential bottleneck of the CPU. In the fifth architecture (and the fourth architecture, as well), the SPUs may support block access to data and permit Erasure Coding or other techniques (such as Redundant Arrays of Independent Disks (RAIDs)) to spread data across multiple KV SSDs in the storage server.

In addition, the KV SSDs may include SPU units themselves, to carry out acceleration, compression, encryption, etc., just like the SPUs of the cache SSDs in the fourth architecture. SPUs may also implement cache management features.

SPUs may be implemented as part of a controller, using a Field Programmable Gate Array (FPGA), Application-Specific Integrated Circuit (ASIC), a Graphics Processing Unit (GPU), or any other desired implementation. DPUs, on the other hand, tend to need more processing power (since they may be asked to execute general instructions for an application), and therefore may be implemented using conventional processors.

In the fourth and fifth architectures, the cache SSDs use both PCIe and Ethernet: PCIe for communicating with the host processor and Ethernet for communicating with the KV SSDs in the storage server. Thus, the cache SSDs may include two ports: one for PCIe communication and one for Ethernet communication. The cache SSDs may communicate with any number of KV SSDs via the Ethernet port: there is no requirement that a single cache SSD may only communicate with a single KV SSD (which would prevent the cache SSD SPU from offering Erasure Coding/RAID functionality).

The cache SSDs may be organized using cache namespaces, with each namespace defining a logically separate area. Each namespace may have its own input and output queues. Since the cache SSDs use both PCIe and Ethernet, the cache namespaces have at least two queues: one on the PCIe side and one on the Ethernet side (there may be more than two queues, depending on how queues are structured: for example, each side has a submission queue and a completion queue: the submission queue is used to receive requests, and a completion queue is used to return results).

The SPU may execute various command, such as Nop (do nothing), Insert (insert partial data into the PU buffer), Write Once (to reconstruct data from Erasure Coding), XOR, Extended OP (to do a more complicated data reconstruction), or Compression, to identify a few.

FIG. 1 shows a system including a compute server and a storage server, according to an embodiment of the inventive concept. In FIG. 1, compute server 105 may be reachable from client 110 via network 115. Client 110 and compute server 105 may be in a client-server relationship: client 110 may issue commands and compute sever 105 may execute those commands. Alternatively, compute server 105 may be a computer being used directly by an end user, avoiding the involvement of client 110. Compute server 105 may access storage server 120 for data via network 115.

Network 115 may be any variety or varieties of network. For example, network 115 may include a Local Area Network (LAN), a Wide Area Network (WAN), a Metropolitan Area Network (MAN), or a global network such as the Internet, among other possibilities. Data may be sent across network 115 directly, or it may be protected: for example, using encryption or a Virtual Private Network (VPN). Network 115 may include wired or wireless connections. In addition, network 115 may include any desired combinations of these alternatives. For example, client 110 might be connected via a wireless connection to a LAN that in turn connects via a wired connection to the Internet, which in turn connects to another LAN to which compute server 105 and storage server 120 are connected. The connections between compute server 105, client 110, and storage server 120 may vary: the connections do not have to be the same in all situations. Further, storage server 120 may be omitted from the diagram if compute server 105 includes the necessary storage.

Figure 2:
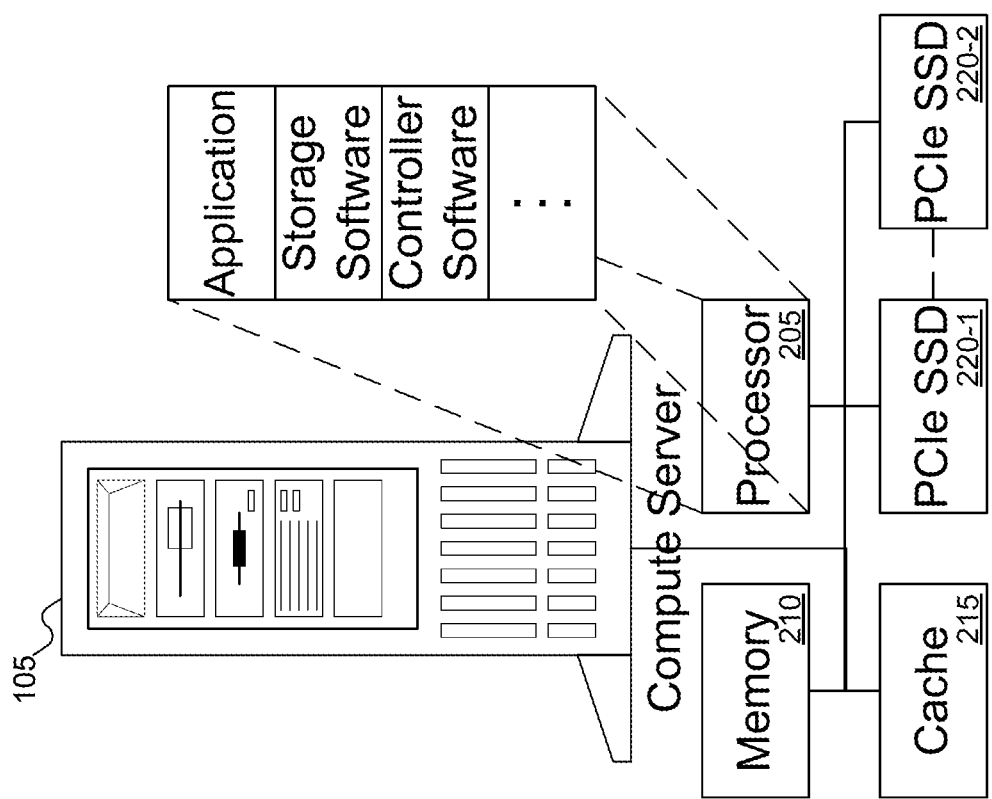
FIG. 2 shows the conventional compute server of FIG. 1 using a converged architecture.

FIG. 2 shows the compute server 105 of FIG. 1 using a converged architecture. In FIG. 2, compute server 105 is shown as including processor 205, memory 210, cache 215, and Peripheral Component Interconnect Express (PCIe) Solid State Drives (SSDs) 220-1 and 220-2. Processor 205 may include a software stack, including the operating system, applications, storage software (such as a file system), and controller software to manage devices attached to compute server 105 (such as memory 210 and PCIe SSDs 220-1 and 220-2). Processor 205 may be any variety of processor: for example, an Intel Xeon, Celeron, Itanium, or Atom processor, an AMD Opteron processor, an ARM processor, etc. While FIG. 2 shows a single processor 205, compute server 105 may include any number of processors, each of which may be single core or multi-core processors, and may be mixed in any desired combination.

Memory 210 and cache 215 may be conventional memory and cache used in support of processing on processor 205. Memory 210 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 210 may also be any desired combination of different memory types. Memory 210 may be managed by a memory controller (not shown in FIG. 2), which may be a separate component in compute server 105 with a driver that is part of the software stack. Memory 210 may be used to store data that may be termed "short-term": that is, data not expected to be stored for extended periods of time. Examples of short-term data may include temporary files, data being used locally by applications (which may have been copied from other storage locations), and the like. Cache 215 may act as very fast local storage (potentially even faster than memory 210) for data being used by processor 205, and may be include non-volatile storage.

Processor 205 and memory 210 may also support an operating system under which various applications may be running. These applications may issue requests to read data from or write data to either memory 210 or PCIe SSDs 220-1 and 220-2. Whereas memory 210 may be used to store data that may be termed "short-term", PCIe SSDs 220-1 and 220-2 are storage devices that may be used to store data that is considered "long-term": that is, data expected to be stored for extended periods of time. PCIe SSDs 220-1 and 220-2 may be accessed using controller software in the software stack running on processor 205. While FIG. 2 shows two PCIe SSDs 220-1 and 220-2, embodiments of the inventive concept may include storage devices of any type and connecting via any desired connection. Thus, PCIe SSDs 220-1 and 220-2 may be replaced with Serial AT Attachment (SATA) hard disk drives, Ethernet SSDs, or storage devices of any other types. Further, embodiments of the inventive concept may include any number (zero or more) of storage devices, and each storage device may be of any desired type: thus, multiple different types of storage devices may be mixed in compute server 105.

Implementing compute server 105 as shown in FIG. 2 has some advantages. The design is simple (only one "box" to consider), and compute server 105 may be relocated with all data being migrated at the same time. But compute server 105 as shown in FIG. 2 also has some disadvantages. First, processor 205 is very busy, since it is responsible for managing all operations within compute server 105: executing applications, running the operating system (and all its background operations), storing and retrieving data from PCIe SSDs 220-1 and 220-2, and so on (this business may be termed CPU saturation). Further, compute server 105 typically only has two sockets, each of which usually supports no more than four storage devices. Thus, the total number of storage devices that may be installed in compute server 105 is typically eight, limiting the extent to which storage may be expanded within compute server 105.

Figure 3:
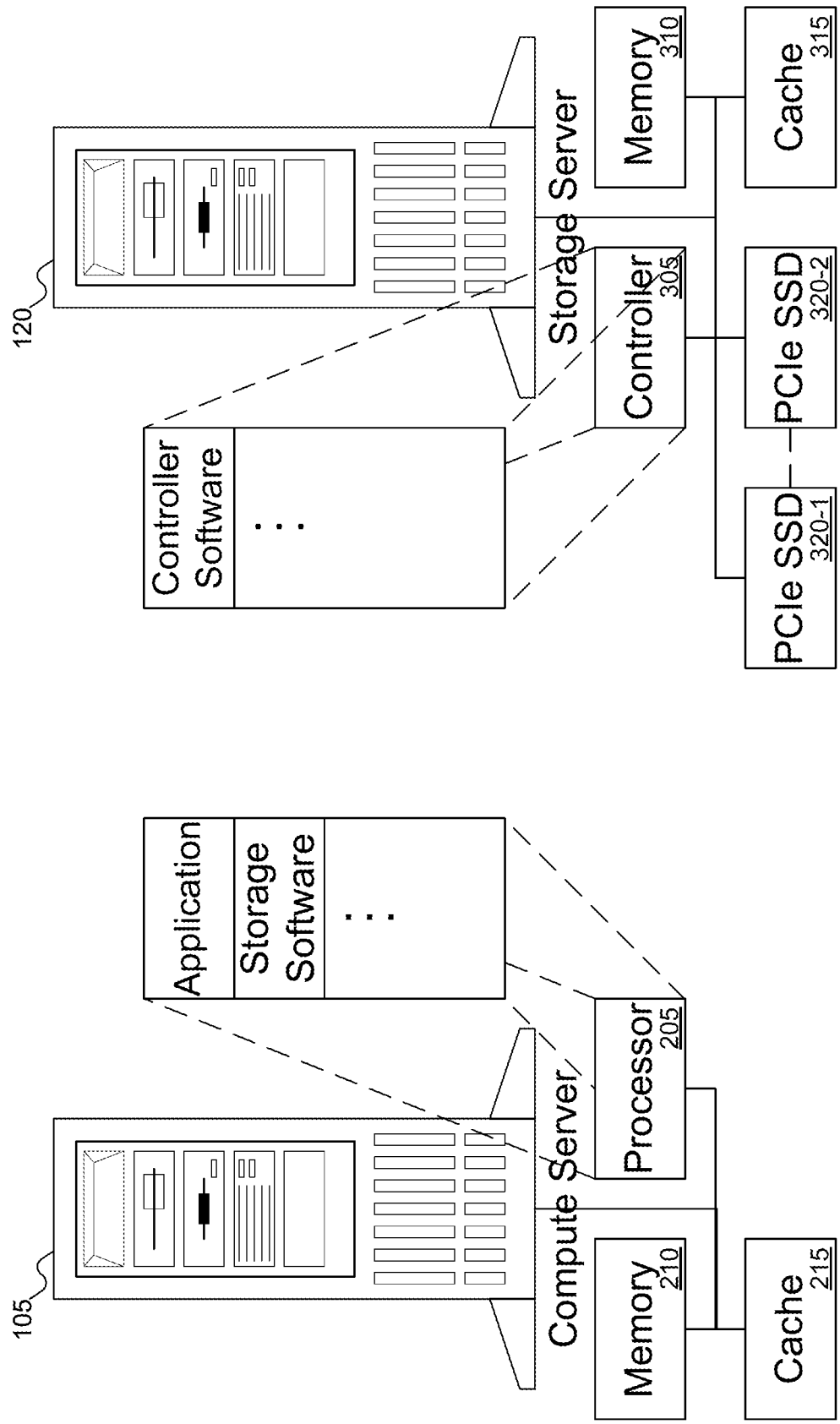
FIGS. 3-5 shows the compute server and the storage server of FIG. 1 using diverged architectures.

To address some of the disadvantages of compute server 105 as shown in FIG. 2, the arrangement shown in FIG. 3 may be used. In FIG. 3, PCIe SSDs 220-1 and 220-2 of FIG. 2 have been removed from compute server 105, and storage server 120 has been added. Storage server 120 may include processor 305, memory 310, cache 315, and PCIe SSDs 320-1 and 320-2. All of these components are functionally similar or identical to those described above with reference to FIG. 2, and their descriptions will not be repeated here. Further, as with FIG. 2, while FIG. 3 shows storage server 120 as including PCIe SSDs 320-1 and 320-2, embodiments of the inventive concept may include any number of storage devices, of any types, and of mixed types. (In the remainder of this document, any reference to a particular type of storage device is intended to encompass any alternative types of storage devices, subject to any requirements of the described storage device.)

By moving PCIe SSDs 220-1 and 220-2 of FIG. 2 from compute server 105 of FIG. 2 to PCIe SSDs 320-1 and 320-2 in storage server 120 in FIG. 3, some of the burdens on processor 205 of compute server 105 are reduced. The controller software may be moved from the software stack of processor 205 to processor 305, reducing the load on processor 205. Further, because storage server 120 may be designed for that purpose (rather than as a more general compute server), storage server 120 may support more than eight storage devices. For example, rack versions of storage devices may support 32 SSDs using M.2 connectors (even more than 32 devices may be possible), providing potentially significantly more storage expandability than may be offered by compute server 105 of FIG. 2.

While FIG. 3 shows only one storage server 120, embodiments of the inventive concept may include any number of storage servers. Further, compute server 105 may communicate with any and/or all of the available storage servers 120, each of which may also communicate with each other.

It is important to note that in FIG. 3, compute server 105 and storage server 120 communicate machine to machine. That is, compute server 105 and storage server 120 each have network ports, and data exchanged between the two machines may pass through the network ports via processors 205 and 305 and memories 210 and 310. Thus, while FIG. 3 reduces the demand on processor 205 of compute server 105 of FIG. 2, the demand is not entirely eliminated: processor 205 may not have to manage the controller software in the software stack, but processor 205 still deals with the data flow. (Further, if there are multiple storage servers 120, then the various storage servers 120 may communicate machine to machine as well.)

In addition, looking to the future, when PCIe generation 5 becomes established, PCIe SSDs 320-1 and 320-2 may be able to send and receive data faster than memory 310 may be able to process that data. Thus, memory 310 may become a bottleneck for data delivery in the embodiment of the inventive concept shown in FIG. 4.

Figure 4:
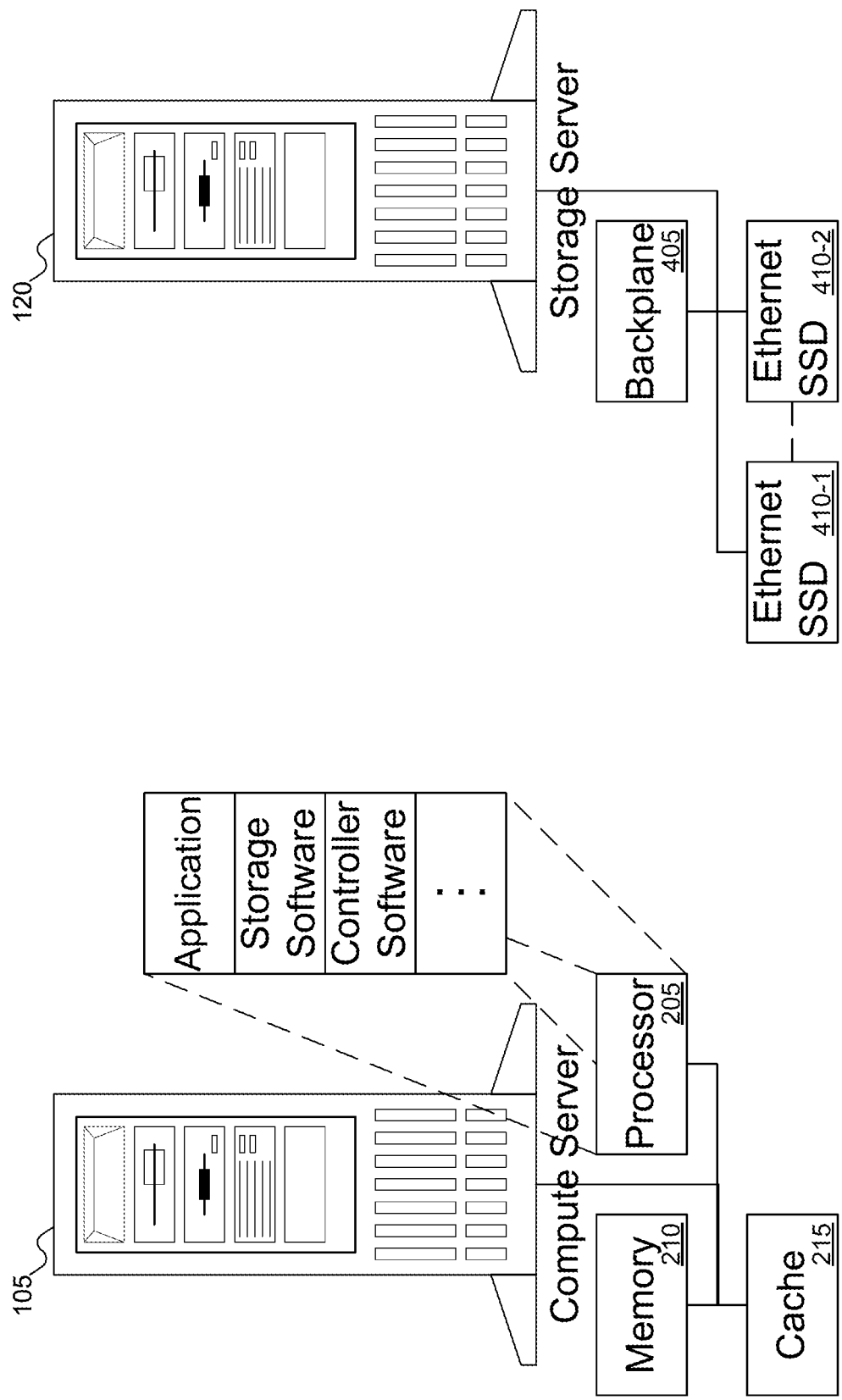

To address some of the disadvantages of compute server 105 and storage server 120 as shown in FIG. 3, the arrangement shown in FIG. 4 may be used. In FIG. 4, storage server 120 has been simplified, eliminating processor 305, memory 310, and cache 315. Instead, storage server 120 may include backplane 405, to which Ethernet SSDs 410-1 and 410-2 may be connected. Unlike storage server 120 of FIG. 3, where data passes through memory 310 of FIG. 3, Ethernet SSDs 410-1 and 410-2 permit direct communication to network 115 of FIG. 1. (Note that Ethernet SSDs 410-1 and 410-2 do necessarily have their own Ethernet network ports: storage server 120 may still include a network port. But Ethernet SSDs 410-1 and 410-2 are capable of communicating directly with the network port on storage server 120, without having to involve a processor and/or memory.) By eliminating memory 310 of FIG. 3, storage server 120 will not have a bottleneck introduced when PCIe Gen 5 is used.

While FIG. 4 shows embodiments of the inventive concept as including Ethernet SSDs 410-1 and 410-2, embodiments of the inventive concept are not limited to Ethernet SSDs. Provided the storage devices include some protocol for communication with compute server 105 (and with the other network-connected storage devices), Ethernet SSDs 410-1 and 410-2 may be replaced with functionally equivalent storage devices.

As with FIG. 3, there may be multiple storage servers 120 in FIG. 4. If so, then compute server 105 may communicate with any Ethernet SSDs 410-1 and 410-2 installed in any and/or all of storage servers 120. Further, Ethernet SSDs 410-1 and 410-2 may communicate with each other, and with Ethernet SSDs installed in other storage servers.

But on the side of compute server 105, network traffic may still pass through processor 205 and memory 210. Thus, memory 210 may still be a potential bottleneck, with data being requested by or sent from Ethernet SSDs 410-1 and 410-2 faster than memory 210 may be able to process. In addition, with the controller software back in the software stack on processor 205, the burden on processor 205 may be increased (undoing some of the benefits of the embodiment of the inventive concept shown in FIG. 3). Finally, since compute server 105 and storage server 120 may communicate across a network, Input/Output latency (the time needed to complete communication) may become a factor in delaying data transmission.

Figure 5:
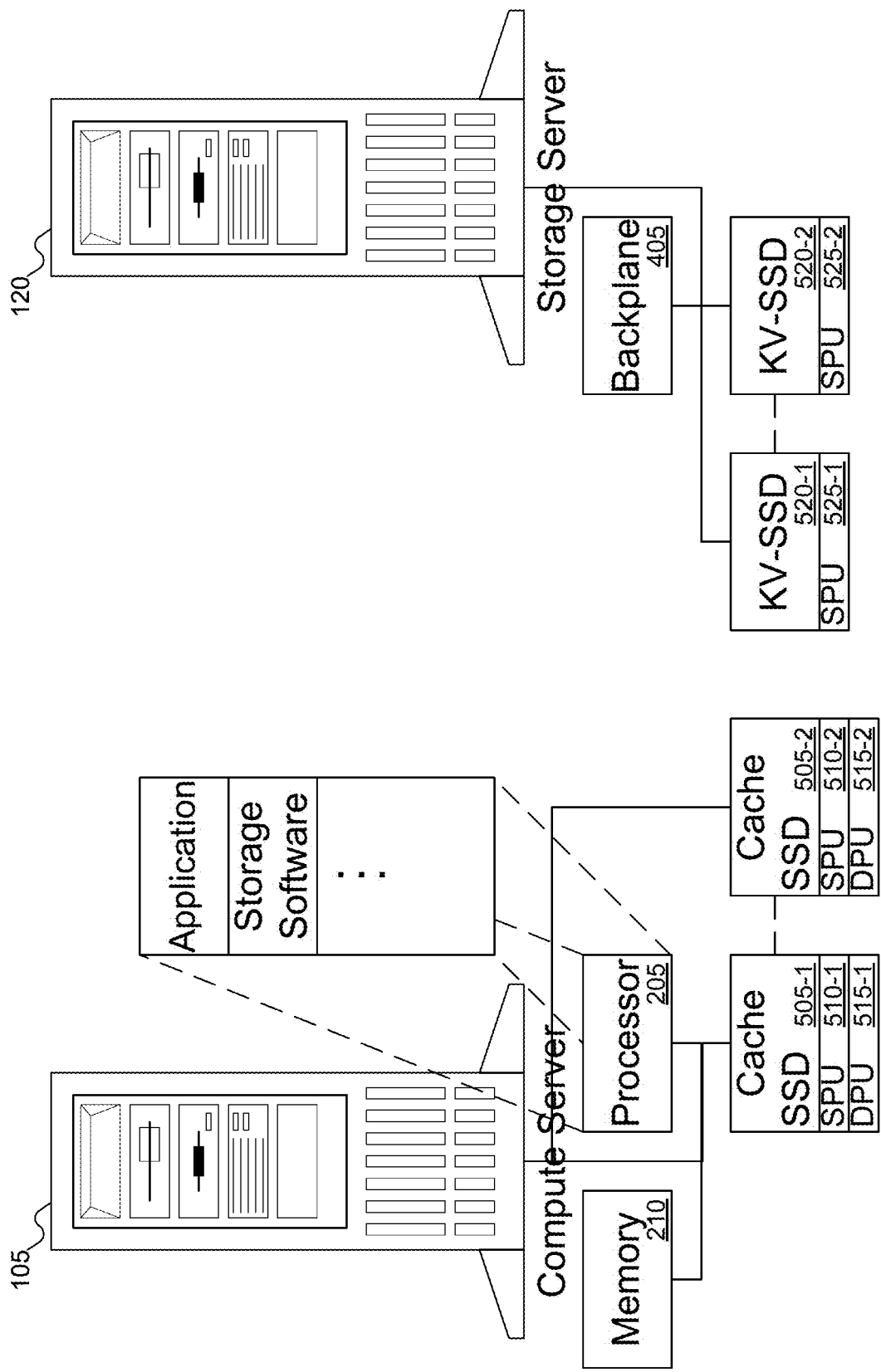

Thus, in FIG. 5, embodiments of the inventive concept are shown that may resolve these issues. In FIG. 5, cache 215 of FIG. 2 has been removed from compute server 105, and cache SSDs 505-1 and 505-2 have been added. Cache SSDs 505-1 and 505-2 may be SSDs (or other storage devices) that may act as local caches of data retrieved from storage server 120. (But compute server 105 may still include a local cache other than cache SSDs 505-1 and 505-2.) Cache SSDs 505-1 and 505-2 may be any desired variety of SSDs: for example, cache SSDs 505-1 and 505-2 may be PCIe SSDs (that is, SSDs that communicate with processor 205 over a PCIe bus). Cache SSDs 505-1 and 505-2 may therefore be block-based SSDs (although cache SSDs 505-1 and 505-2 may also use different storage methodologies than block-based storage). Cache SSDs 505-1 and 505-2 may be SSDs that are "smart", in the sense that cache SSDs 505-1 and 505-2 may manage the storage and retrieval of data from storage server 120. To that end, cache SSDs 505-1 and 505-2 may include storage processing units (SPUs) 510-1 and 510-2. Cache SSDs 505-1 and 505-2 may also communicate directly over a network (such as network 115 of FIG. 1), much like Ethernet SSDs 410-1 and 410-2 of FIG. 4, rather than leaving communication to processor 205.

SPUs 510-1 and 510-2 may handle any aspects of storage and retrieval of data. For example, SPUs 510-1 and 510-2 may handle encryption and decryption of data, compression and decompression of data, and the use of erasure coding and/or error correction codes (ECCs) when storing data on any and/or all storage devices within storage server 120. Thus, if the data is stored across multiple storage devices, SPUs 510-1 and 510-2 may select the storage devices on which the data is stored, how the data is divided across those storage devices (including the generation of any ECC data that may be stored on the storage devices), how the data is compressed, and how the data is encrypted. By including SPUs 510-1 and 510-2 in cache SSDs 505-1 and 505-2, the software stack within processor 205 is reduced (SPUs 510-1 and 510-2 act in place of the controller software in terms of directing data to the appropriate storage devices in storage server 120). SPUs may be implemented as part of a controller (such as a SSD controller within cache SSDs 505-1 and 505-2), using a Field Programmable Gate Array (FPGA), Application-Specific Integrated Circuit (ASIC), a Graphics Processing Unit (GPU), a general purpose GPU (GPGPU), or any other desired implementation.

Cache SSDs 505-1 and 505-2 may also include general data processing units (DPUs) 515-1 and 515-2. While SPUs 510-1 and 510-2 enable the offloading of management of the storage devices within storage server 120, DPUs 515-1 and 515-2 enable the offloading of application processing from processor 205. That is, DPUs may be thought of as auxiliary processors that may be utilized by processor 205 to reduce its workload. Thus, DPUs 515-1 and 515-2 may be used to further reduce the burden on processor 205, which may now be reduced to performing the basic management of compute server 105.

DPUs 515-1 and 515-2 may also be used to perform acceleration functions on data. For example, an application running on processor 205 might wish to perform a query on a database to count the number of entries that satisfy a particular criteria. The entirety of the data may be retrieved and loaded into memory 210 so that processor 205 may perform the query. But if the data is to be discarded immediately after the query is completed, such an approach requires transmission of a great deal of data when only a small amount of data is ultimately needed. Instead of having processor 205 perform the query, DPU 515-1 and/or 515-2 may perform the query on the data retrieved from storage server 120, and just return to processor 205 the results of the query. (It may even be possible to shift performance of the query all the way to storage server 120 to further increase efficiencies, as discussed in co-pending U.S. patent application Ser. No. 16/820,665, filed Mar. 16, 2020, and co-pending U.S. patent application Ser. No. 16/820,675, filed Mar. 16, 2020, both of which claim the benefit of U.S. Provisional Patent Application Ser. No. 62/819,499, filed Mar. 15, 2019, U.S. Provisional Patent Application Ser. No. 62/834,900, filed Apr. 16, 2019, U.S. Provisional Patent Application Ser. No. 62/945,877, filed Dec. 9, 2019, and U.S. Provisional Patent Application Ser. No. 62/945,883, filed Dec. 9, 2019, all of which are incorporated by reference herein for all purposes.)

While the above describes using DPUs 515-1 and 515-2 to perform the acceleration function, SPUs 510-1 and 510-2 may also be used to perform acceleration functions. But if SPUs 510-1 and 510-2 are not implemented using general processors, SPUs 510-1 and 510-2 may only be capable of implementing specific acceleration functions that for which they have been programmed. A general processor, such as may be used to implement DPUs 515-1 and 515-2, may be able to perform any acceleration function without being specifically programmed to implement such acceleration functions.

DPUs 515-1 and 515-2 are optional equipment: any number of cache SSDs (from zero to every cache SSD) in compute server 105 may include DPUs. Because DPUs 515-1 and 515-2 tend to need more processing power as compared with SPUs 510-1 and 510-2 (since they may be asked to execute general instructions for an application), DPUs 515-1 and 515-2 may be implemented using conventional processors included within cache SSDs 505-1 and 505-2. In addition, cache SSDs 505-1 and 505-2 may include a single component that acts as both SPU and DPU, rather than separate components. Thus, for example, cache SSD 505-1 might include a single component that functions as both SPU 510-1 and DPU 515-1 (with cache SSD 505-2 potentially similarly arranged). As with other descriptions relating to storage devices, different cache SSDs may be implemented differently. Thus, one cache SSD in compute server 105 might include only an SPU, another cache SSD in in compute server 105 might include both an SPU and a DPU, but implemented as separate components, and a third cache SSD in compute server 105 might include a single components that functions as both SPU and DPU.

In FIG. 5, storage server 120 is shown as including Key-Value SSDs (KV-SSDs) 520-1 and 520-2. While Ethernet SSDs 410-1 and 410-2 of FIG. 4 may be used in storage server 120 in the embodiments of the inventive concept shown in FIG. 5, KV-SSDs tend to be more efficient than SSDs that use block-based storage. Thus, replacing Ethernet SSDs 410-1 and 410-2 of FIG. 4 with KV-SSDs 520-1 and 520-2 may introduce added efficiencies and reducing the workload on cache SSDs 505-1 and 505-2 (cache SSDs 505-1 and 505-2 do not necessarily need to track what is stored on which storage devices within storage server 120) (although block-based storage may be used in the embodiments of the inventive concept shown in FIG. 5). Like Ethernet SSDs 410-1 and 410-2 of FIG. 4, KV-SSDs 520-1 and 520-2 may communicate directly with components of compute server 105 (and with other KV-SSDs, both within storage server 120 and other storage servers not shown in FIG. 5). Like cache SSDs 505-1 and 505-2, KV-SSDs 520-1 and 520-2 may be any desired variety of SSD: for example, KV-SSDs 520-1 and 520-2 may be Ethernet KV-SSDs (that is, SSDs that are designed to communicate across networks using Ethernet).

Like cache SSDs 505-1 and 505-2, KV-SSDs 520-1 and 520-2 may include SPUs 525-1 and 525-2. SPUs 525-1 and 525-2 may permit KV-SSDs 520-1 and 520-2 to perform local encryption/decryption, compression/decompression, error correction coding, acceleration, and other desired functions applicable to data stored on KV-SSDs 520-1 and 520-2. SPUs 525-1 and 525-2 are optional equipment: any number of KV-SSDs (from zero to every KV-SSD) in storage server 120 may include SPUs. SPUs 525-1 and 525-2 may also be independent of SPUs 510-1 and 510-2: any operations performed by SPUs 525-1 and 525-1 may be performed without reference to whether SPUs 510-1 and 510-2 have acted on the data. For example, co-pending U.S. patent application Ser. No. 16/820,665, filed Mar. 16, 2020, and co-pending U.S. patent application Ser. No. 16/820,675, filed Mar. 16, 2020, both of which claim the benefit of U.S. Provisional Patent Application Ser. No. 62/819,499, filed Mar. 15, 2019, U.S. Provisional Patent Application Ser. No. 62/834,900, filed Apr. 16, 2019, U.S. Provisional Patent Application Ser. No. 62/945,877, filed Dec. 9, 2019, and U.S. Provisional Patent Application Ser. No. 62/945,883, filed Dec. 9, 2019, all of which are incorporated by reference herein for all purposes, describe how data may be encoded as well as compressed, even though compression after encoding may not introduce much added benefit (in terms of space saved). In the same way, SPUs 525-1 and 525-2 may apply their own operations even though such operations may be of little benefit after the operations applied by SPUs 510-1 and 510-2.

Figure 6:
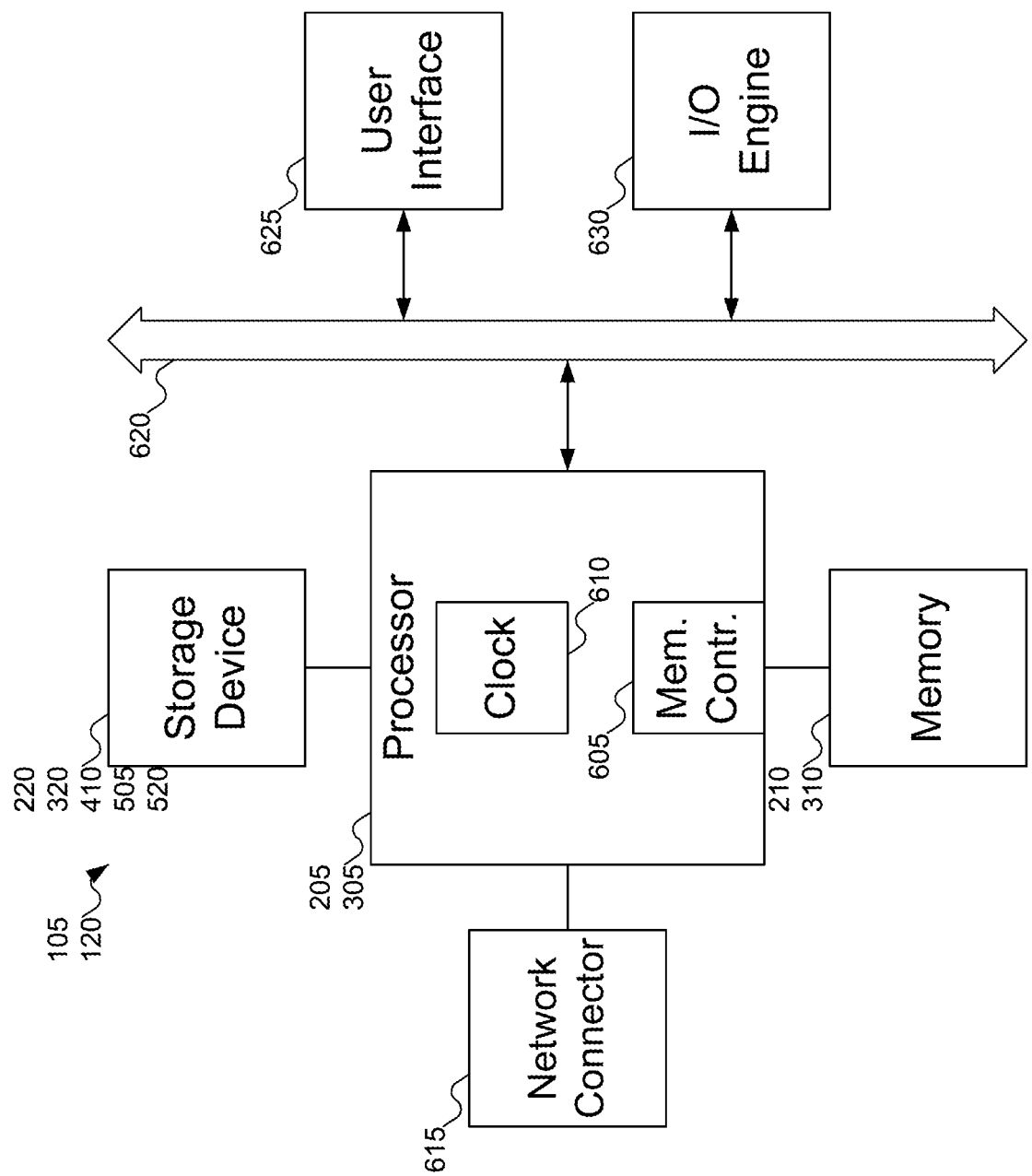
FIG. 6 shows details of the compute server and the storage server of FIG. 1.

FIG. 6 shows details of compute server 105 and storage server 120 of FIG. 1. In FIG. 6, typically, compute server 105 and storage server 120 may include one or more processors 205 and/or 305, which may include memory controllers 605 and clocks 610, which may be used to coordinate the operations of the components of the machine. Processors 205 and 305 may also be coupled to memories 210 and/or 310, which may include random access memory (RAM), read-only memory (ROM), or other state preserving media, as examples. Processors 205 and/or 305 may also be coupled to storage devices 220, 320, 410, 505, and/or 520, and to network connector 615, which may be, for example, an Ethernet connector or a wireless connector. Processors 205 and/or 305 may also be connected to buses 620, to which may be attached user interfaces 625 and Input/Output interface ports that may be managed using Input/Output engines 630, among other components.

Figure 7:
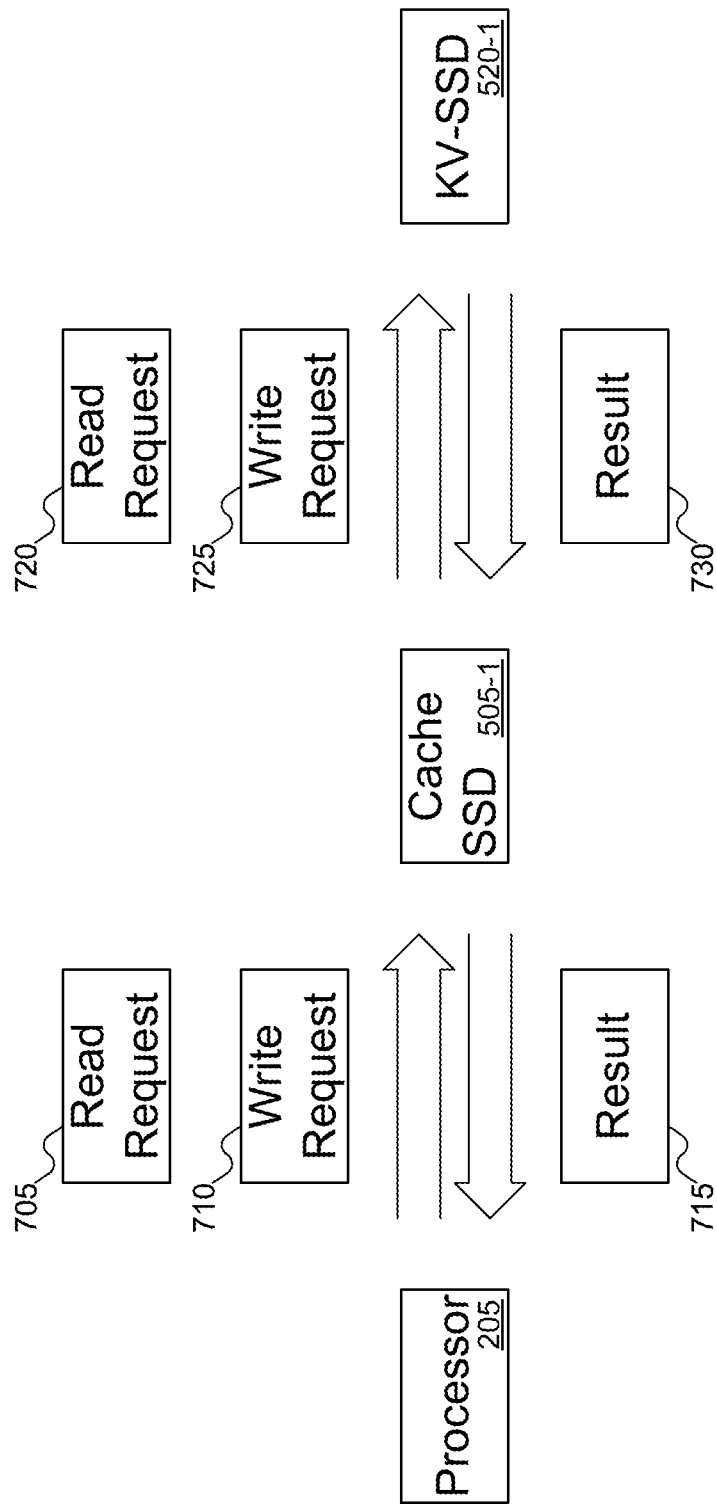
FIG. 7 shows messages being exchanged between the compute server of FIG. 1, the cache Solid State Drives (SSDs) of FIG. 5, and the Key-Value SSDs (KV-SSDs) of FIG. 5.

FIG. 7 shows messages being exchanged between compute server 105 of FIG. 1, cache SSDs 505-1 and 505-2 of FIG. 5, and KV-SSDs 520-1 and 520-2 of FIG. 5. In FIG. 5, processor 205 of compute server 105 of FIG. 1 may send read request 705 and/or write request 710. Requests 705 and 710 may be sent to cache SSD 505-1 (cache SSD 505-2 of FIG. 5 may also be the target of requests 705 and 710, as may be any other cache SSDs in compute server 105 of FIG. 1). Cache SSD 505-1 may then receive requests 705 and 710 and attempt to satisfy them locally. For example, if cache SSD 505-1 stores data requested in read request 705, cache SSD 505-1 may return that data directly to processor 205 as result 715. Similarly, if cache SSD 505-1 receives write request 710, cache SSD 505-1 may store the data in cache SSD 505-1 before sending any requests to KV-SSD 520-1 (or any other KV-SSD in any storage server 120 of FIG. 1). If so equipped, cache SSD 505-1 may even send result 715 back to processor 205 before the data is ultimately written to KV-SSD 620-1 (which is sometimes termed an early acknowledgment).

If cache SSD 505-1 does not store the data requested in read request 705, or if cache SSD 505-1 receives write request 710, cache SSD 505-1 may send read request 720 or write request 725 to KV-SSD 520-1. KV-SSD 520-1 may then process requests 720 and 725 and may return result 730 (which may be the data requested in read request 720 or an acknowledgment that the data was written from write request 725). Cache SSD 505-1 may then process result 730 and return result 715 to processor 205 in turn. (The above description refers to "processing" result 730 because if cache SSD 505-1 includes DPU 515-1 of FIG. 5, or if SPU 510-1 of FIG. 5 is properly implemented, cache SSD 505-1 may, for example, execute an acceleration function on the data returned in result 730.)

Figure 8:
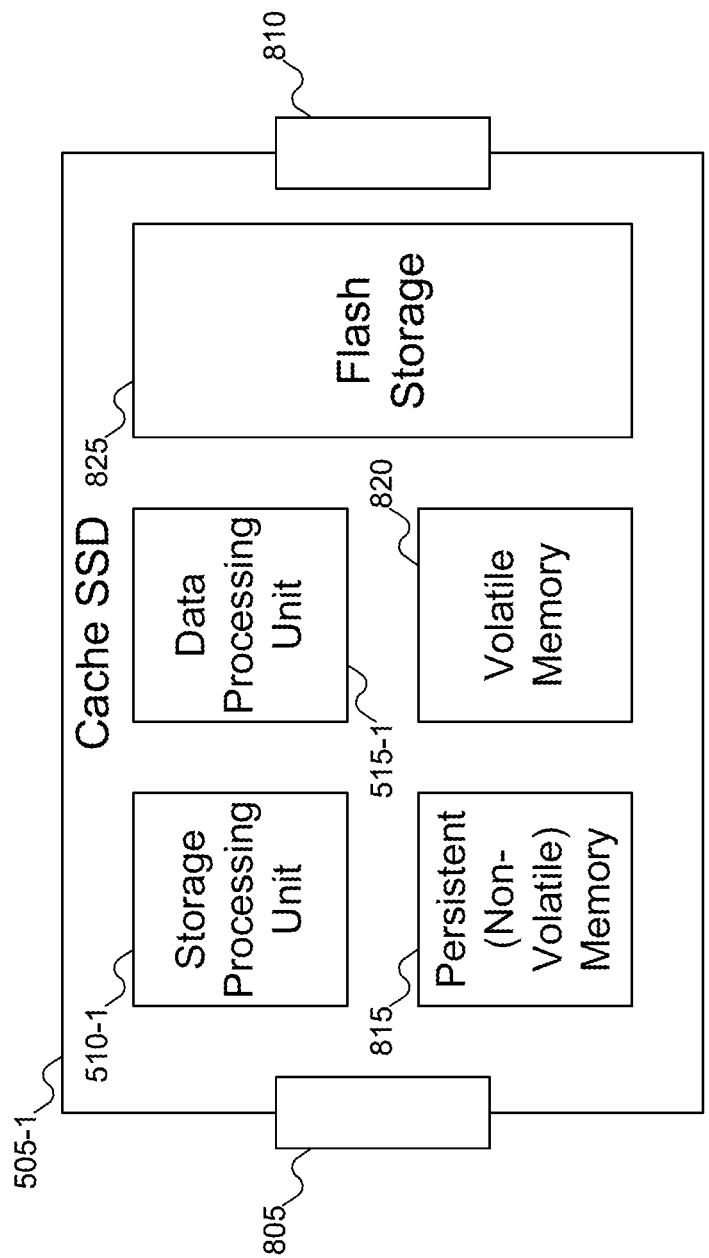
FIG. 8 shows details of the cache SSDs of FIG. 5.

FIG. 8 shows details of cache SSDs 505-1 and 505-2 of FIG. 5. In FIG. 8, cache SSD 505-1 is shown. Cache SSD 505-1 may include ports 805 and 810, SPU 510-1, DPU 515-1, persistent memory 815, volatile memory 820, and flash storage 825. SPU 510-1 and DPU 515-1 have been discussed above with reference to FIG. 5 (recall that DPU 515-1 is optional, and may be omitted from cache SSD 505-1).

Ports 805 and 810 may be ports to communicate with various other components. For example, in one embodiment of the inventive concept, as discussed above, cache 505-1 may be a PCIe SSD and KV-SSDs 520-1 and 520-2 of FIG. 5 may be Ethernet-equipped KV-SSDs. Thus, port 805 may be a PCIe port for communicating with processor 205 of FIG. 5 and port 810 may be an Ethernet port for communicating with KV-SSDs 520-1 and 520-2 of FIG. 5.

Persistent memory 815 may be used to store information that should not be lost, even if power were to be unexpectedly interrupted to cache SSD 505-1. Examples of the information that might be maintained in persistent memory 815 may include information about which KV-SSDs 520-1 and 520-2 of FIG. 5 store data for which files (and where that data is stored on KV-SSDs 520-1 and/or 520-2), or data that was subject to write request 710 of FIG. 7 from processor 205 of FIG. 5 but which has not yet been written to KV-SSDs 520-1 and/or 520-2 of FIG. 5. Because persistent memory 815 should be persistent, persistent memory 815 may be implemented using any desired technology that protects against data loss: for example, non-volatile storage or volatile storage that is subject to battery backup.

Flash storage 825 may be used to store data as the cache for processor 205 of FIG. 5. As FIG. 8 describes cache SSD 505-1 as an SSD, and SSDs typically use flash storage for data, FIG. 8 shows cache SSD 505-1 as including flash storage 825. But if cache SSD 505-1 were instead implemented using a different form of storage technology (for example, a hard disk drive), flash storage 825 may be replaced with the hardware appropriate to store data for that technology.

Persistent memory 815 and flash storage 825 may seem redundant: typically both are forms of storage that are protected against data loss due to power interruptions. But persistent memory 815 be a faster form of storage than flash storage 825: persistent memory 815 may be, for example, a cache for cache SSD 505-1. But in some embodiments of the inventive concept, as flash storage 825 may be used to store all data in non-volatile forms, persistent memory 815 may be omitted.

Volatile memory 820 may be used to store data whose loss due to an unexpected power interruption would not be a problem. For example, volatile memory 820 may be used to process data being subject to an acceleration function: if the data is only partially processed when power is lost, there may be little point in ensuring the data is not lost (it may not be possible to determine the portion of processing that has been completed on the data, and therefore the original data should be retrieved from KV-SSDs 520-1 and/or 520-2 again and the acceleration function executed from the start). Volatile memory 820 may also be used to store other data whose loss is not of concern. Volatile memory 820 may be any form of memory as discussed above with reference to memories 210 and 310 of FIGS. 2-5.

Figure 9:
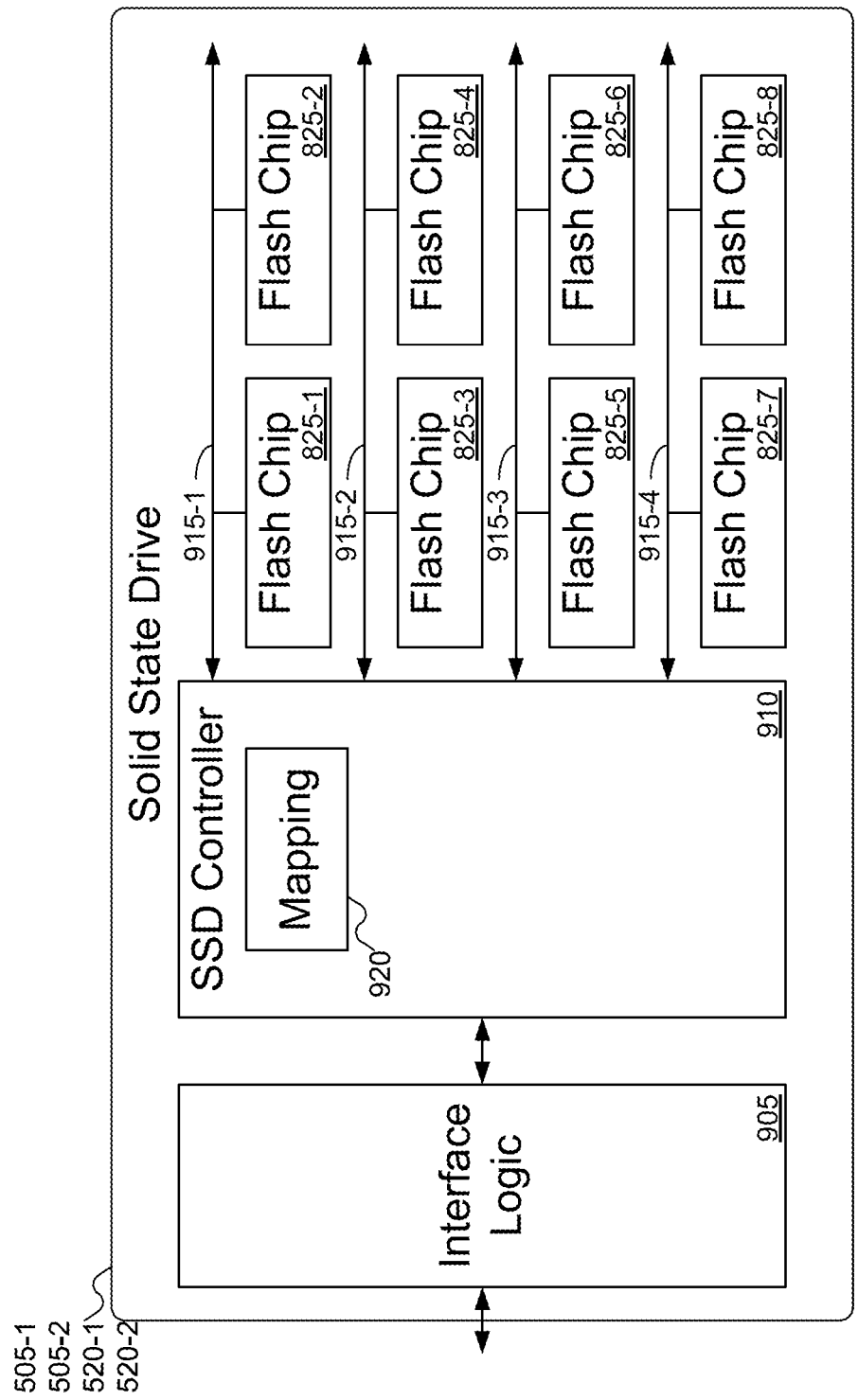
FIG. 9 shows details of the SSDs of FIG. 5.

FIG. 9 shows details of SSDs 505-1, 505-2, 520-1, and 520-2 of FIG. 5. In FIG. 9, SSDs 505-1, 505-2, 520-1, and 520-2 may include host interface layer (HIL) 905, SSD controller 910, and various flash memory chips 825-1 through 825-8 (also termed "flash memory storage"), which may be organized into various channels 915-1 through 915-4. Host interface logic 905 may manage communications between SSDs 505-1, 505-2, 520-1, and 520-2 and other components (such as processor 205 of FIG. 5 or other SSDs). These communications may include read requests 705 and/or 720 of FIG. 7 to read data from SSDs 505-1, 505-2, 520-1, and 520-2 and write requests 710 and/or 725 of FIG. 7 to write data to SSDs 505-1, 505-2, 520-1, and 520-2. Host interface logic 905 may manage an interface across only a single port (for example, KV-SSDs 520-1 and 520-2 of FIG. 5 might only communicate with cache SSDs 505-1 and 505-2 of FIG. 5), or it may manage interfaces across multiple ports (for example cache SSDs 505-1 and 505-2 of FIG. 5 may communicate using different approaches with both processor 205 of FIG. 5 and KV-SSDs 520-1 and 520-2 of FIG. 5). Alternatively, an SSD that includes multiple ports may have a separate host interface logic 905 to manage interfaces across each port. Embodiments of the inventive concept may also mix the possibilities (for example, an SSD with three ports might have one host interface logic to manage one port and a second host interface logic to manage the other two ports).

SSD controller 910 may manage the read and write operations, along with garbage collection and other operations, on flash memory chips 825-1 through 825-8 using a flash memory controller (not shown in FIG. 9).

SSD controller 910 may include mapping 920. Mapping 920 may manage where particular data is stored in flash memory chips 825-1 through 825-8. The exact form mapping 920 may take may depend on the implementation of the SSD. An SSD that uses block addressing may implement mapping 920 as a translation layer (sometimes referred to as flash translation layer (FTL)). A translation layer may perform the conventional functions of translating logical block addresses (LBAs) into physical block addresses (PBAs) where the data is actually stored. On the other hand, if SSD uses a key-value storage model, then mapping 920 may map object keys to addresses into physical addresses.

While FIG. 9 shows SSDs 505-1, 505-2, 520-1, and 520-2 as including eight flash memory chips 825-1 through 825-8 organized into four channels 915-1 through 915-4, embodiments of the inventive concept may support any number of flash memory chips organized into any number of channels. Similarly, while FIG. 9 shows the structure of an SSD, other storage devices (for example, hard disk drives) may be implemented using a different structure.

Figure 10:
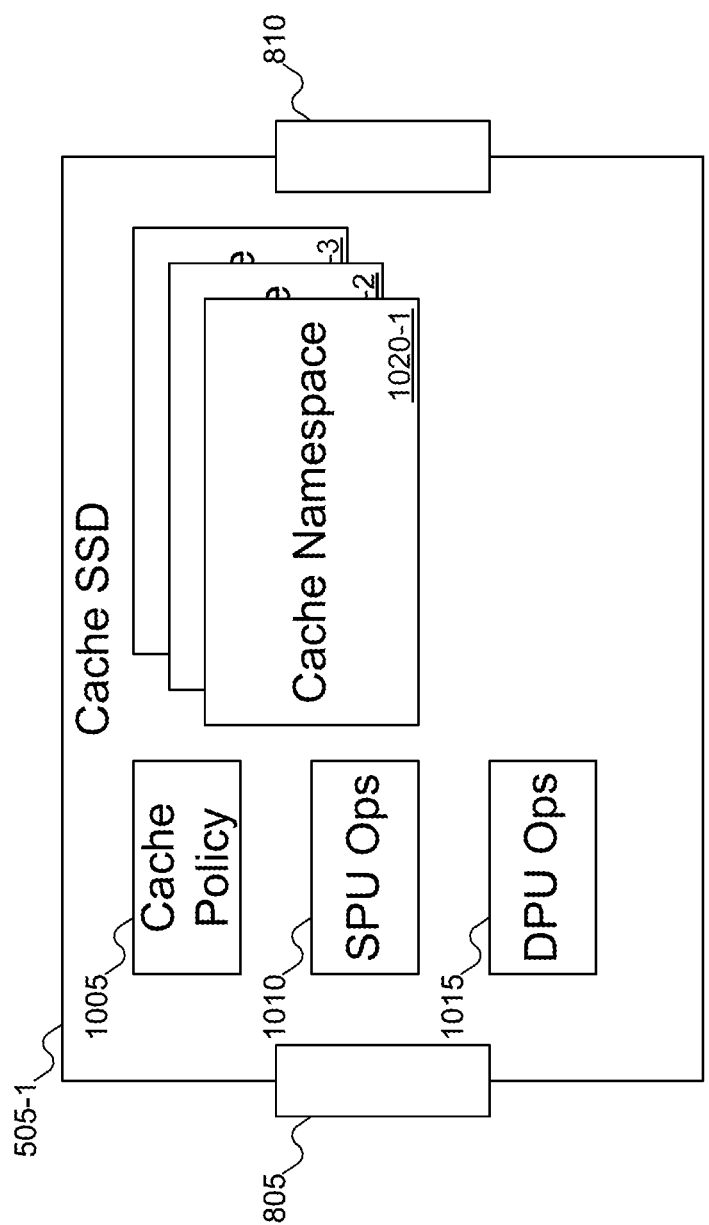
FIG. 10 shows an alternative view of the cache SSDs of FIG. 5.

FIG. 10 shows an alternative view of cache SSDs 505-1 and 505-2 of FIG. 5. FIG. 10 presents more of an architectural/software view of cache SSDs 505-1 and 505-2: the hardware that supports this view is described further with reference to FIGS. 11A-11C below.

In FIG. 10, cache SSD 505-1 is shown as including ports 805 and 810. Cache SSD 505-1 may also include cache policy 1005, SPU operations 1010 and DPU operations 1015, and cache namespaces 1020-1, 1020-2, and 1020-3. Cache namespaces 1020-1, 1020-2, and 1020-3 represent different ways to organize data moving through cache SSD 505-1. For example, data relating to one application may go through one cache namespace, data for another application may go through a second cache namespace, and so on. A single cache namespace may support multiple applications, and a single application might use multiple cache namespaces to manage its data: embodiments of the inventive concept are intended to cover all such variations.

Cache policy 1005 represents rules by which data may be stored in and evicted from cache SSD 505-1. There may be multiple cache policies, and different applications may specify different cache policies. For example, one application may prefer to use a Least Recently Used (LRU) cache policy, whereas another application may prefer to use a Least Frequently Used (LFU) cache policy. Other cache policies may also be used.

SPU operations 1010 and DPU operations 1015 describe operations that may be performed by SPUs 510-1 and 510-2 and DPUs 515-1 and 515-2 of FIG. 5. Example operations that may be performed by SPU 510-1 and 510-2 of FIG. 5 may include a NOP (no operation), Insert (to insert partial data into a processing unit buffer), Write Once, XOR (exclusive OR), Extended Op (for example, data reconstruction from erasure coding information), and compression. But these operations are merely exemplary, and other operations may also be performed. More obvious examples include reading partial data from a processing unit buffer, dividing data into portions for erasure coding (such as spreading data across multiple storage devices, as well as generating parity information for data reconstruction in case a storage device fails), decompression, and so on.

Figure 11A:
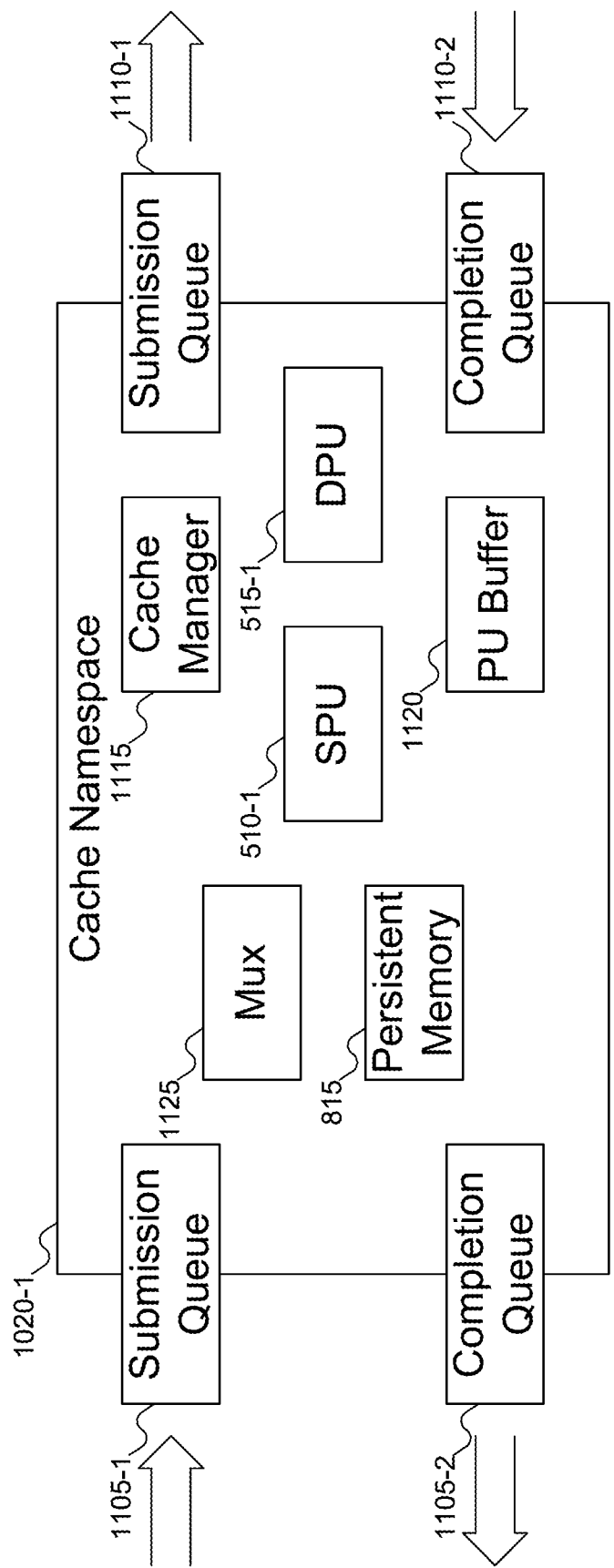
FIGS. 11A-11C shows details of the cache namespace of FIG. 10.
Figure 11B:
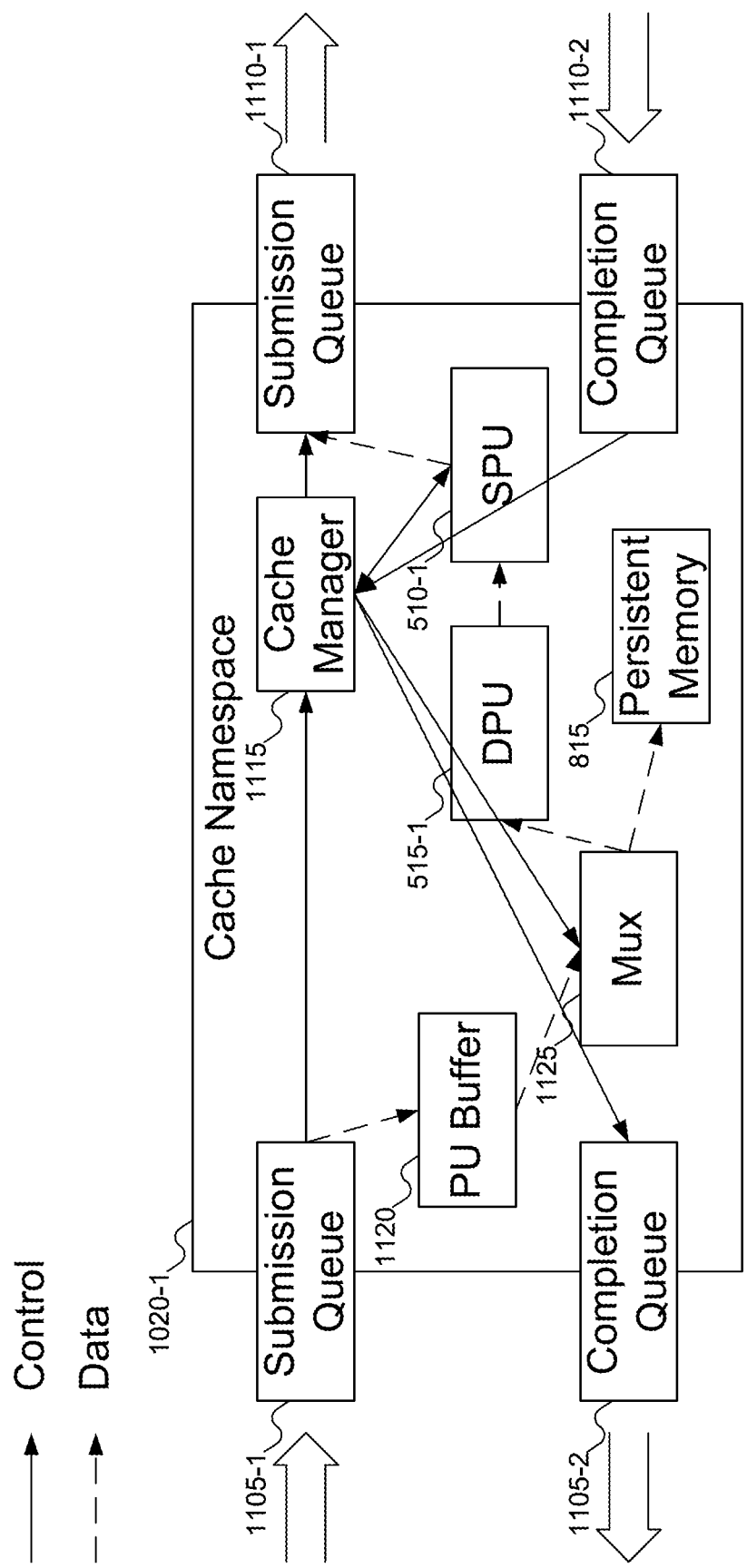
Figure 11C:
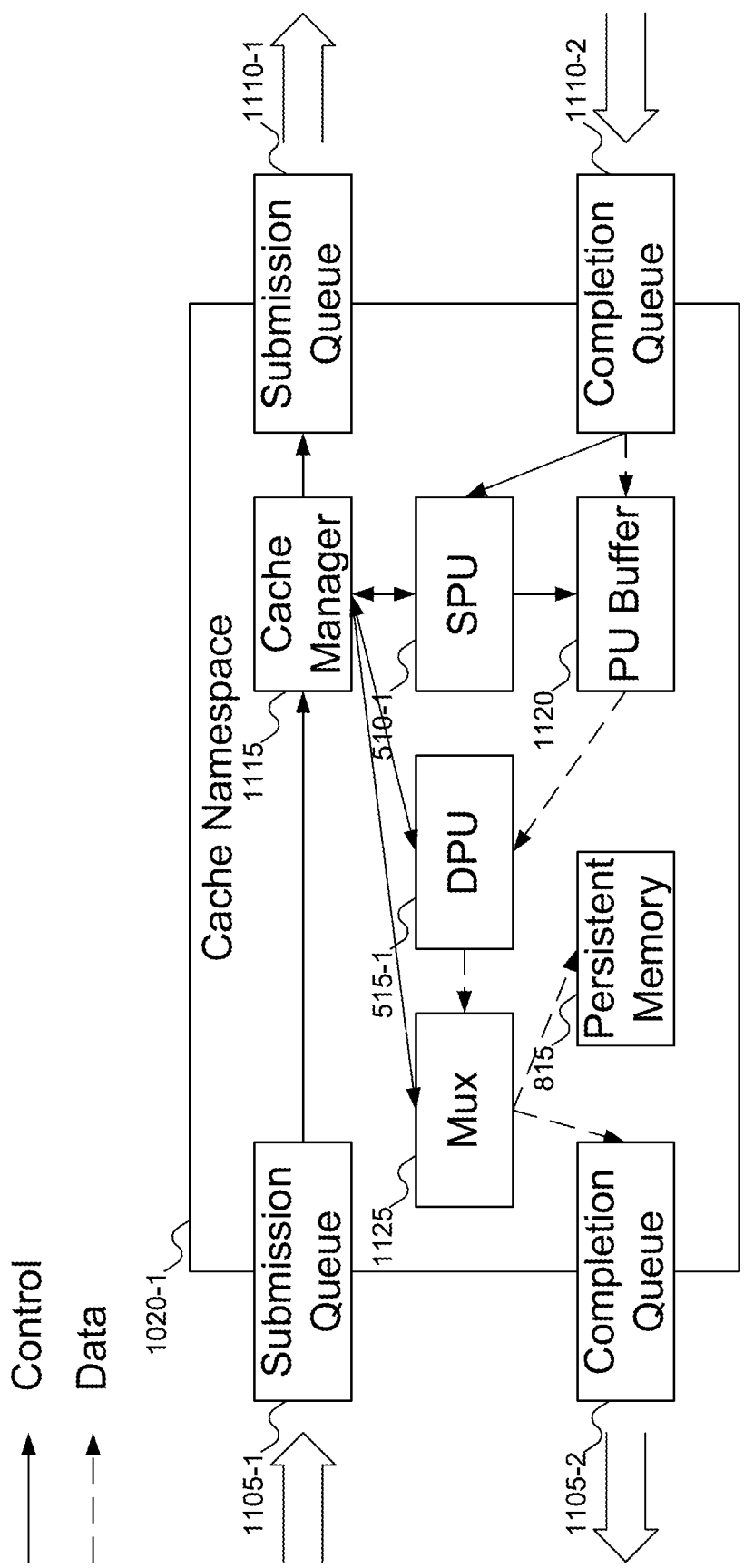

FIGS. 11A-11C shows details of cache namespaces 1020-1, 1020-2, and 1020-3 of FIG. 10. In FIG. 11A, cache namespace 1020-1 is shown. Cache namespace 1020-1 may include submission queues 1105-1 and 1110-1, completion queues 1105-2, and 1110-2, SPU 510-1, DPU 515-1 (which may be omitted), persistent memory 815, cache manager 1115, processing unit (PU) buffer 1120, and multiplexer 1125. SPU 510-1, DPU 515-1, and persistent memory 815 have been described above with references to FIGS. 5 and 8, and will not be repeated here.

Submission queues 1105-1 and 1110-1 and completion queues 1110-1 and 1110-2 may be used to send and receive data from various sources. Thus, submission queue 1105-1 may include requests submitted to cache namespace 1020-1: for example, read request 705 or write request 710 of FIG. 7 that may originate from processor 205 of FIG. 5. Completion queue 1110-1 may be used to send response 715 back to processor 205 of FIG. 5. Similarly, submission queue 1105-2 may include requests submitted to KV-SSDs 520-1 and/or 520-2 of FIG. 5 by cache namespace 1020-1: for example, read request 720 or write request 725 of FIG. 7, and completion queue 1110-2 may be used to receive response 730 back from KV-SSDs 520-1 and/or 520-2 of FIG. 5.

Submission queue 1105-1 and completion queue 1110-1 may form one queue pair, and submission queue 1105-2 and completion queue 1110-2 may for another queue pair. Each queue pair may be associated with a port on cache SSD 505-1 of FIG. 5. Thus, for example, submission queue 1105-1 and completion queue 1110-1 may be associated with port 805 of FIG. 8, and submission queue 1105-2 and completion queue 1110-2 may be associated with port 810 of FIG. 8.

Queue pairs such as those shown in FIG. 11A are not necessarily physically present; they may be merely symbolic. That is, there may not be a separate physical queue pair for each cache namespace within cache SSD 505-1 of FIG. 5, but each queue pair may be more a "virtual" queue pair for the associated cache namespace. Which "virtual" queue pair a particular message belongs to may be identified by other data in the request: for example, the application issuing the request (for requests received via submission queue 1105-1) or data in the result (for results received via completion queue 1110-2) that identifies the request to which the result is responsive.

Cache manager 1115 may use cache policy 1005 of FIG. 10 along with information from SPU 510-1 and/or DPU 515-1 (if included in cache namespace 1020-1) to determine how to handle a particular request received from processor 205 of FIG. 5 via submission queue 1105-1. Thus, cache manager 1115 may access both submission queue 1105-1 and completion queue 1110-1 (to access requests 705 and/or 710 of FIG. 7 received from processor 205 of FIG. 5 and to send result 715 of FIG. 7 back to processor 205 of FIG. 5. Cache manager 1115 may also communicate with both SPU 510-1 and DPU 515-1 to determine how to handle the request. Further, since handling a particular request may involve sending further requests to KV-SSDs 520-1 and/or 520-2 of FIG. 5, cache manager 1115 may also access submission queue 1105-2 (to send requests 720 and/or 725 of FIG. 7 to KV-SSDs 520-1 and/or 520-2 of FIG. 5) and completion queue 1110-2 (to access result 730 of FIG. 7 received from KV-SSDs 520-1 and/or 520-2 of FIG. 5).

PU buffer 1120 may be used to disassemble data (when writing data to multiple KV-SSDs 520-1 and 520-2 of FIG. 5: for example, when data is being split across multiple storage devices) or to reassemble data (when reading data from multiple KV-SSDs 520-1 and 520-2 of FIG. 5: for example, when data was previously split across multiple storage devices. Finally, multiplexer 1125 may be used to direct data to various destinations, based on its intended use.

FIG. 11B shows a flow diagram for handling write request 710 of FIG. 7 from processor 205 of FIG. 5. In FIG. 11B, the various components within cache namespace 1020-1 have been rearranged to show data flow more simply, but this rearrangement is simply for simpler understanding of FIG. 11B. In FIG. 11B, both data and control are used by cache namespace 1020-1. Control flow is depicted using solid lines, and data flow is depicted using dashed lines.

When write request 710 of FIG. 7 is accessed from submission queue 1105-1, write request 710 of FIG. 7 may be delivered to cache manager 1115, and the data is sent to PU buffer 1120, and thence to multiplexer 1125. Cache manager 1115 may then determine, using cache policy 1005 of FIG. 10, where the data should be sent from multiplexer 1125. If the data is to be stored within cache namespace 1020-1 (and not written to KV-SSDs 520-1 and/or 520-2 of FIG. then the data may be directed to persistent memory 815 (the data may also be sent to flash storage 820 of FIG. 8 in addition to or instead of persistent memory 815). If the data is to be stored on KV-SSDs 520-1 and/or 520-2 of FIG. 5, then the data may be directed to DPU 515-1. (Note that these alternatives are not "either-or" alternatives: the data may be sent to both persistent memory 815 and ultimately to KV-SSDs 520-1 and/or 520-2 of FIG. 5.)

DPU 515-1 may perform any appropriate pre-storage operations handled by DPU 515-1. For example, if some acceleration function is to be applied to the data before storage, DPU 515-1 may execute this acceleration function. The data may then be delivered to SPU 510-1, which may perform storage-related operations. For example, SPU 510-1 may encode, encrypt, and/or compress the data; SPU 510-1 may add Error Correcting Codes to the data; and SPU 510-1 may divide the data into smaller portions to perform erasure coding (again, these are not alternatives: SPU 510-1 may perform any desired combination of storage-related operations on the data prior to storage.) SPU 510-1 (and/or cache manager 1115) may then generate the appropriate commands to store the data on KV-SSDs 520-1 and/or 520-2 of FIG. 5 (reflected by the convergence of the lines representing control and data flow to submission queue 1110-1. Such command generation may include, for example, generating a KV command to store an object with a particular key on KV-SSDs 520-1 and/or 520-2 of FIG. 5. This key may be generated in any manner desired: for example, as a hash of the name of the file representing the data or some other identifier associated with the data (such as the LBA assigned to the data by processor 205 of FIG. 5). By placing the appropriate command in submission queue 1110-1, the data may then be stored on KV-SSDs 520-1 and/or 520-2 of FIG. 5. (KV-SSDs 520-1 and 520-2 of FIG. 5 may handle the KV commands using conventional KV-SSD storage techniques.) The keys used to store the objects containing the data may be stored for later use: persistent memory 815 or mapping 920 of FIG. 9 are two possible locations to store such key information.

Note that the above discussion said that the data may be divided into portions, so that different portions may be stored on different KV-SSDs 520-1 and/or 520-2 of FIG. 5. (Of course, even with the data being divided into different portions, at least some of the different portions might end up being stored on the same KV-SSD, much like how a file that is too large to fit into a RAID stripe across the available disks may store data in multiple stripes that span all of the available disks.) While KV storage devices may expect each object stored on a single KV storage device to have a unique key, it is not necessarily true that keys are unique across multiple KV storage devices. That is, the same key might be used to store data on each of KV-SSDs 520-1 and 520-2 of FIG. 5. SPU 510-1 (and cache manager 1115) may leverage this fact to keep the keys that identify objects including data that is part of the same file related. In other words, the same key may be used to store one portion of data on KV-SSD 520-1 of FIG. 5, a second portion of data on KV-SSD 520-2 of FIG. 5, and so on (up to the number of KV storage devices in storage server 120 of FIG. 5).

Alternatively, SPU 510-1 (and cache manager 1115) may assign different (but still potentially related) keys to portions of data stored on different KV storage devices. For example, after hashing the file name or other data (such as the LBA), SPU 510-1 (and cache manager 1115) might append an index to each key to identify the order in which the portions of data should be reassembled upon read request 705 of FIG. 7. (Cache namespace 1020-1 may track such ordering information regardless of what methodology is used to generate the keys, but there is no harm in redundant approaches.) Thus, if the key assigned to the data was the string "object key", the key used for the first portion of the data might be "object key_1", the key used for the second portion of the data might be "object key_2", and so on.

There are a number of reasons why SPU 510-1 (and cache manager 1115) might divide the data into portions. Aside from erasure coding, it might be that the total data is too large to fit in a single object on KV-SSDs 520-1 and/or 520-2 of FIG. 5 (assuming that KV-SSDs 520-1 and/or 520-2 of FIG. 5 have limits on the size of an individual object). Or the size of the data may be too large to fit into a single KV-SSD (for example, the largest KV-SSD may be 1 terabyte in size, but the data requires 2 terabytes to store). But assuming the data would fit on a single KV-SSD, that the KV-SSD is capable of internally managing object size (and divide large data into smaller chunks of data that would fit into objects whose size may be limited), and that there is no other reason to divide the data into portions, SPU 510-1 (and cache manager 1115) may just send the entire object to KV-SSDs 520-1 and/or 520-2 of FIG. 5 without first dividing the data into portions.

It is also possible that SPU 510-1 (and cache manager 1115) might store the same data in multiple places (perhaps for redundancy). The same key may be used to store the same data on more than one KV storage device. When such embodiments of the inventive concept are used, when processing read request 705 of FIG. 7 for the data, cache namespace 1020-1 might send a request to read the data (using the appropriate key) to any number of KV-SSDs 520-1 and/or 520-2 of FIG. 5 (that is, cache namespace 1020-1 might request the data from only one KV storage device, from two KV storage devices, and so on up to all available KV storage devices). KV storage devices that store the data may then return the requested data; KV storage devices that do not store the data may return messages indicating the data was not found. Cache namespace 1020-1 might then return the data from any of the KV storage devices (since any KV storage device that stores the data should store the same data), and may discard any other responses (both successful data retrievals and negative responses).

Returning to the control flow, eventually KV-SSDs 520-1 and/or 520-2 of FIG. 5 should place response 730 of FIG. 7 in completion queue 1110-2. This result may be retrieved from completion queue 1110-2 by cache manager 1115 and result 715 of FIG. 7 may be placed in completion queue 1105-2 for later use by processor 205 of FIG. 5. Result 715 of FIG. 7 may just be an unedited forwarding of result 730 of FIG. 7, or it may be an edited forwarding of result 730 of FIG. 7, or it may be an entirely new message, albeit perhaps returning the same general information—namely, that the data was successfully stored.

Although the above discussion suggests that all storage-related processing of the data is performed by SPU 510-1 within SPU 510-1, some embodiments of the inventive concept may perform such processing elsewhere (although perhaps under instruction from SPU 510-1 and/or cache manager 1115). For example, PU buffer 1120 may be a buffer which may store the data, and SPU 510-1 (and cache manager 1115) may process the data while in PU buffer 1120. Alternatively, PU buffer 1120, while represented as separate from SPU 510-1 in FIGS. 11A-11C, may actually be implemented within SPU 510-1, thus enabling SPU 510-1 to perform storage-related processing of the data as described.

Although not explicitly described above, at any point (once the data is within cache namespace 1020-1 and protected against loss due to power failure) cache namespace 1020-1 may place result 715 of FIG. 7 in completion queue 1105-2, providing an early acknowledgment of write request 710 of FIG. 7 to processor 205 of FIG. 5. Alternatively, cache namespace 1020-1 might not place result 715 of FIG. 7 in completion queue 1105-2 until after receiving result 730 of FIG. 7 from KV-SSDs 520-1 and/or 520-2 of FIG. 5 via completion queue 1110-2. Embodiments of the inventive concept are intended to cover both such variations.

Note that in the above discussion, how KV-SSDs 520-1 and/or 520-2 of FIG. 5 are selected to store the data is not discussed. Cache namespace 1020-1 may use any desired methodology to select which KV-SSDs store the data. Possible methodologies that may be used include:

Random selection from among available KV-SSDs.
Round robin selection of KV-SSDs (that is, identifying the KV-SSDs in a particular sequence, and selecting the next KV-SSD from the sequence, restarting from the first KV-SSD after the last KV-SSD in the sequence has been used).
Balancing the amount of data stored on each KV-SSD (in other words, selecting the KV-SSD with the smallest amount of stored data).

Balancing the percentage of data stored on each KV-SSD (in other words, selecting the KV-SSD that has the smallest amount of stored data relative to its total capacity).

Selecting a KV-SSD to satisfy Quality of Service (QoS) requirements of the application storing the data (QoS requirements may include minimum or maximum latency of the storage device, minimum or maximum bandwidth of the storage device, encryption offered by the storage device, and isolation from data of another application: U.S. patent application Ser. No. 15/227,955, filed Aug. 3, 2016, now U.S. Pat. No. 10,437,486, issued Oct. 8, 2019, which claims the benefit of U.S. Provisional Patent Application Ser. No. 62/341,063, filed May 24, 2016, both of which are incorporated by reference herein for all purposes, describes other possible QoS requirements that may be applied).

In addition, multiple storage devices may be selected. As discussed above, cache namespace 1020-1 may divide the data into portions and store different portions on different storage devices. Cache namespace 1020-1 may also select multiple storage devices to store the data for redundancy purposes (redundancy may also be a QoS requirement of the application).

Once storage devices have been selected to store the data (or portions thereof), cache namespace 1020-1 may keep track of which storage devices have been selected. This information may be stored in persistent memory 815, mapping 920 of FIG. 9, or any other desired location. This information (which storage devices store the data) may also be stored with the key(s) used to store the data on the storage devices. But note that neither which storage devices, nor which keys are used to store the data, are absolutely necessary. As discussed above, the keys may be generated from other information (such as the file name or the LBA of the data), permitting their recovery. And while storing which storage devices store the data is helpful, it is also possible to simply attempt to retrieve the data from all storage devices. The storage devices that store the data (or portions thereof) may respond with what they store, while storage devices that do not store the data may respond negatively (since the key provided by cache namespace 1020-1 should not match up with a key storing data on those storage devices). Storing information about which storage devices store the data may simply avoid querying devices that do not store the data.

Note too that if the data is divided into portions, that information may be stored with the information about which storage devices store the data and/or the keys used as well. Storing information about how the data is divided may expedite reassembly of the complete data. But if the portions of the data include information about their order (for example, by including a header that identifies that a particular portion of data is portion i of n), then cache namespace 1020-1 may not need to store this information either.

FIG. 11C shows a flow diagram for handling read request 705 of FIG. 7 from processor 205 of FIG. 5. In FIG. 11C, the various components within cache namespace 1020-1 have been rearranged to show data flow more simply, but this rearrangement is simply for simpler understanding of FIG. 11C. In FIG. 11C, both data and control is used by cache namespace 1020-1. Control flow is depicted using solid lines, and data flow is depicted using dashed lines.

When read request 705 of FIG. 7 is accessed from submission queue 1105-1, read request 705 of FIG. 7 may be delivered to cache manager 1115. Cache manager 1115 may then generate appropriate KV commands (there may be one or more KV commands, depending on how the data was stored) to retrieve the object storing the requested data, and place these KV commands in submission queue 1110-1. The appropriate KV commands may be generated in FIG. 11C similarly to the KV command discussed above with reference to FIG. 11B, except that the KV command may be to retrieve data rather than to store data. The appropriate key(s) may be generated (for example, by hashing the file name requested or the LBA of the data), with indices added if appropriate to how the objects were stored.

When KV-SSDs 520-1 and/or 520-2 of FIG. 5 return the requested data, results 730 of FIG. 7 may be placed in completion queue 1110-2. SPU 510-1, in coordination with cache manager 1115, may then be notified and the data loaded into PU buffer 1120. SPU 510-1 may then perform any storage-related processing on the data in PU buffer 1120. For example, if the data was stored in multiple objects, SPU 510-1 may reassemble the original data my placing the portions in the correct order in PU buffer 1120. If the data was compressed, encoded, and/or encrypted, SPU 510-1 may perform the appropriate decompression/decoding/decryption. If Error Correcting Codes were added to the data, SPU 510-1 may use the Error Correcting Codes to verify that the data was correctly returned and, if not, attempt to correct the errors (or notify processor 205 of FIG. 5 that the data was not successfully retrieved). As with SPU 510-1 in FIG. 11B, SPU 510-1 may perform any desired combination of operations appropriate to the data.

Once SPU 510-1 has completed any storage-related operations on the data, the data may be delivered to DPU 515-1, which may then perform any additional functions on the data appropriate to DPU 515-1 (in coordination with cache manager 1115). For example as discussed above, the data might involve a large data set with many entries, but processor 205 of FIG. 5 may only be interested in knowing how many entries in the data set meet a particular condition. DPU 515-1 may perform the appropriate query on the data and instead return the result of the query (rather than the entire data set).

After DPU 515-1 of FIG. 1 has finished processing the data, the data may be delivered to multiplexer 1125. Multiplexer 1125, in coordination with cache manager 1115, may then direct the data to either persistent memory 815 or to completion queue 1105-2 for return to processor 205 of FIG. 5. (As with FIG. 11B, multiplexer 1125 may direct the data to both persistent memory 815 and to completion queue 1105-2: the choice is not an "either-or" choice.) Once result 715 of FIG. 7 is placed in completion queue 1105-2, processor 205 of FIG. 5 may access result 715 of FIG. 7 and process it accordingly.

Figure 12A:
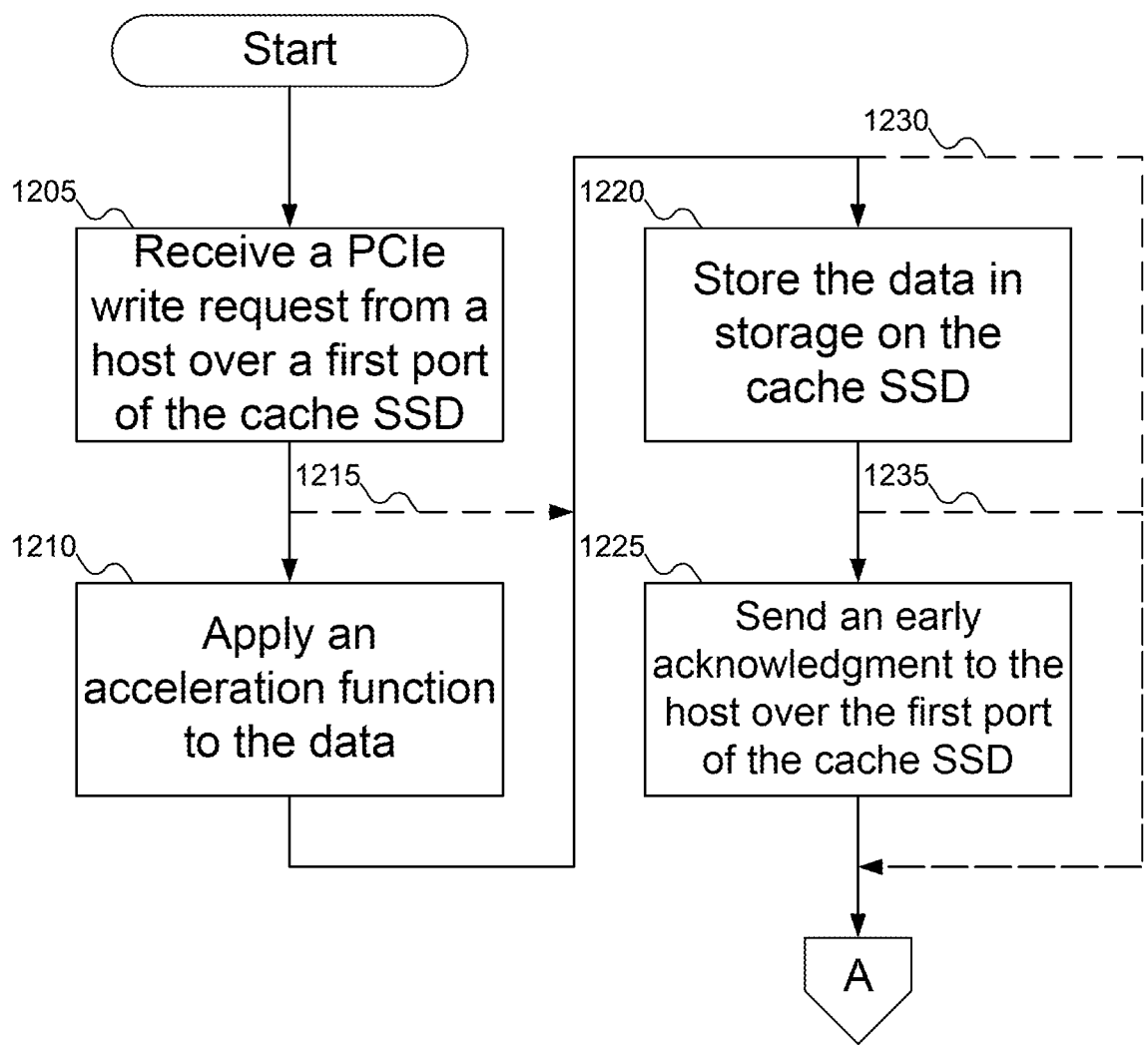
FIGS. 12A-12B show a flowchart of an example procedure for the cache SSD of FIG. 5 to process a write request from the compute server of FIG. 1, according to an embodiment of the inventive concept.
Figure 12B:
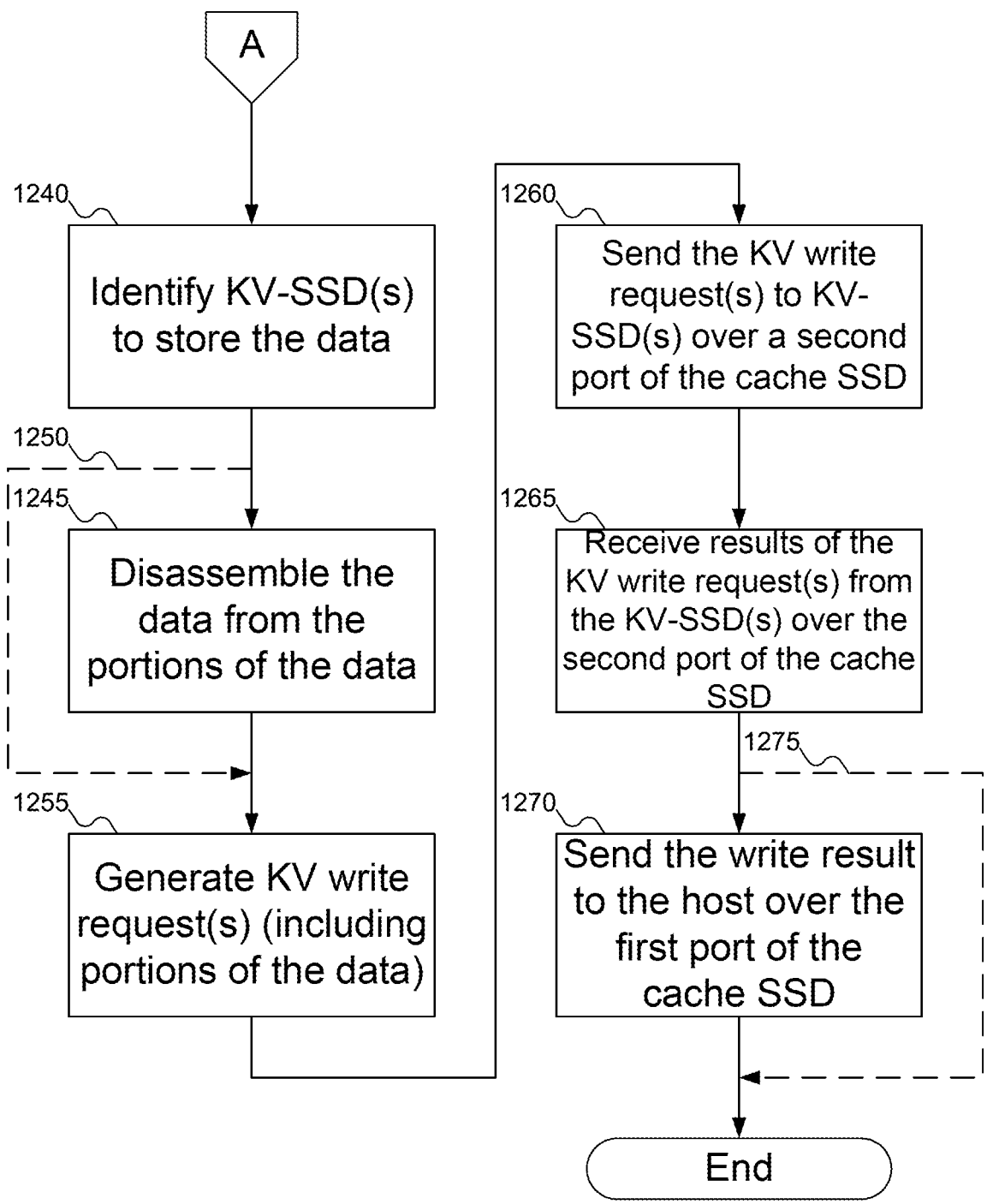

FIGS. 12A-12B show a flowchart of an example procedure for cache SSDs 505-1 and 505-2 of FIG. 5 to process write request 710 of FIG. 7 from compute server 105 of FIG. 1, according to an embodiment of the inventive concept. In FIG. 12A, at block 1205, cache SSD 505-1 and/or 505-2 of FIG. 5 may receive write request 710 of FIG. 7 from processor 205 of FIG. 5. Cache SSDs 505-1 and 505-2 may receive write request 710 of FIG. 7 via submission queue 1105-1 of FIG. 11B over port 805 of FIG. 8. At block 1210, DPU 515-1 may apply an acceleration function to the data. Block 1210 is optional, as shown by dashed line 1215. At block 1220, the data may be stored in cache SSD 505-1 and/or 505-2 of FIG. 5. Such storage may be within flash storage 820 of FIG. 8, persistent memory 815 of FIG. 11B, PU buffer 1120 of FIG. 11B, or any other desired location (as long as the data is protected against lost due to power failure). At block 1225, cache namespace 1020-1 of FIG. 11B may send an early acknowledgment that the data was written by placing result 715 of FIG. 7 in completion queue 1105-1 of FIG. 11B, which may be delivered to processor 205 of FIG. 5 via completion queue 1105-2 of FIG. 11B over port 805 of FIG. 8. Blocks 1220 and 1225 are variously optional, as shown by dashed lines 1230 and 1235.

At block 1240 (FIG. 12B), SPU 510-1 of FIG. 11B may determine appropriate KV-SSDs 520-1 and/or 520-2 of FIG. 5 to store the data. KV-SSDs 520-1 and/or 520-2 may be intended to store the entirety of the data, or they may be intended to store only one portion (of some number of portions) of the data. As discussed above with reference to FIG. 11B, any desired methodology may be used to select the KV-SSDs to store the data (or portions thereof). At block 1245, SPU 510-1 of FIG. 11B may disassemble the data into portions. (SPU 510-1 of FIG. 11 may also perform other storage-related operations at this time, as described above with reference to FIG. 11B.) Of course, if the data is being stored in a single object within a single KV-SSD, then block 1245 may be omitted, as shown by dashed line 1250. At block 1255, SPU 510-1 may generate the appropriate KV commands to send to KV-SSDs 520-1 and/or 520-2 of FIG. 5, and at block 1260 these KV commands may be sent to KV-SSDs 520-1 and/or 520-2 of FIG. 5 by being placed in submission queue 1110-1 of FIG. 11B, which may be delivered to KV-SSDs 520-1 and/or 520-2 of FIG. 5 via port 810 of FIG. 8. Cache namespace 1020-1 of FIG. 11B may also store information about how the data is stored on KV-SSDs 520-1 and/or 520-2 of FIG. 5: for example, by identifying which KV-SSDs store the data or portions of the data, what keys are used to store the data, and which portions of the data each KV-SSD stores. But as discussed above with reference to FIG. 11B, depending on how the data is stored on KV-SSDs 520-1 and/or 520-2 of FIG. 5, none of this information may be necessary to be able to retrieve and reassemble the data from KV-SSDs 520-1 and/or 520-2 of FIG. 5.

At block 1265, cache manager 1115 of FIG. 11B may access results 730 of FIG. 7 from completion queue 1110-2 of FIG. 11B, which may be received from KV-SSDs 520-1 and/or 520-2 of FIG. 5 via port 810 of FIG. 8. These results 730 of FIG. 7 may originate from the KV-SSDs 520-1 and/or 520-2 that were instructed to store some or all of the data. At block 1270, cache manager 1115 of FIG. 11B may place result 715 of FIG. 7 in completion queue 1105-2 of FIG. 11B, to inform processor 205 of FIG. 5 over port 805 of FIG. 8 that the data has been successfully stored. Block 1270 is optional, as shown by dashed line 1275; but at least one of blocks 1225 (FIG. 12A) and 1270 should be performed, or else processor 205 of FIG. 5 would not be notified that the data was successfully stored.

Figure 13A:
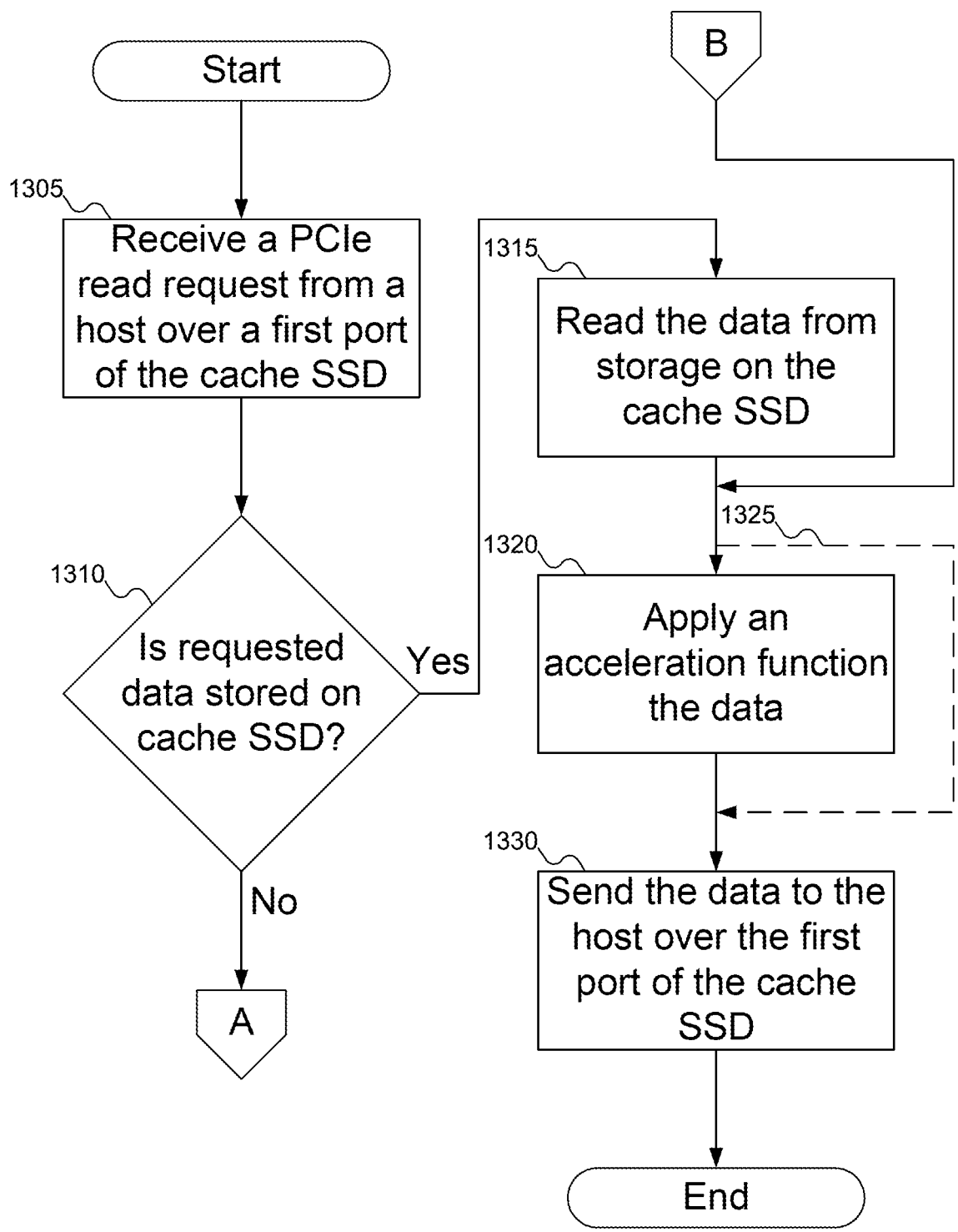
FIGS. 13A-13B show a flowchart of an example procedure for the cache SSD of FIG. 5 to process a read request from the compute server of FIG. 1, according to an embodiment of the inventive concept.
Figure 13B:
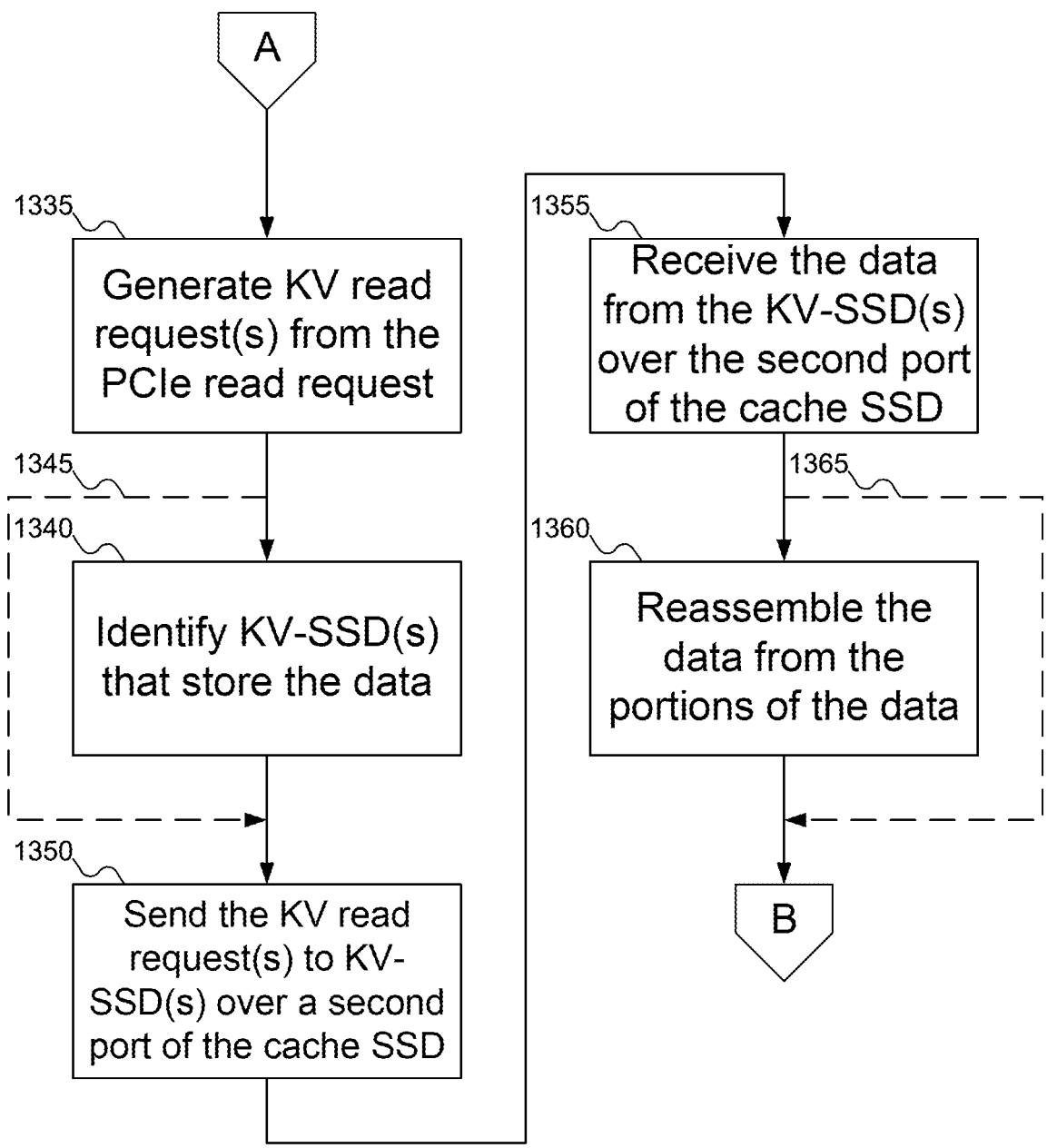

FIGS. 13A-13B show a flowchart of an example procedure for cache SSDs 505-1 and 505-2 of FIG. 5 to process read request 705 of FIG. 7 from compute server 105 of FIG. 1, according to an embodiment of the inventive concept. In FIG. 13A, at block 1305, cache SSDs 505-1 and/or 505-2 of FIG. 5 may receive read request 705 of FIG. 7 from processor 205 of FIG. 5. Cache SSDs 505-1 and 505-2 may receive read request 705 of FIG. 7 via submission queue 1105-1 of FIG. 11C over port 805 of FIG. 8. At block 1310, cache SSDs 505-1 and/or 505-2 of FIG. 5 may check to see if the data requested in read request 705 of FIG. 7 is stored locally (perhaps in persistent memory 815 of FIG. 11C or flash storage 825 of FIG. 8). If the data requested in read request 705 of FIG. 7 is stored locally, then at block 1315 cache SSDs 505-1 and/or 505-2 of FIG. 5 may read the data from local storage. At block 1320, DPUs 515-1 and/or 515-2 of FIG. 5 may apply an acceleration function on the data. Block 1320 is optional, as shown by dashed line 1325. Finally, at block 1330, cache SSDs 505-1 and/or 505-2 of FIG. 5 may return the data to processor 205 of FIG. 5 by placing result 715 of FIG. 7 in completion queue 1105-2 of FIG. 11C, which may be delivered to processor 205 of FIG. 5 via port 805 of FIG. 8.

On the other hand, if the data requested in read request 705 of FIG. 7 is not stored on cache SSDs 505-1 and/or 505-2, then at block 1335 (FIG. 13B), SPU 510-1 of FIG. 11C (possibly working in conjunction with cache manager 1115 of FIG. 11C) may generate KV requests to read the data from KV-SSDs 520-1 and/or 520-2 of FIG. 5. At block 1340, KV-SSDs 520-1 and/or 520-2 of FIG. 5 that store the data may be identified. Block 1340 may be omitted, as shown by dashed line 1345, although in that case cache namespace 1020-1 of FIG. 11C may need to send requests to every KV-SSD in storage server 120 of FIG. 5 to retrieve the data.

At block 1350, SPU 510-1 of FIG. 11C (and cache manager 1115 of FIG. 11C) may send read request 720 of FIG. 7 to KV-SSDs 520-1 and/or 520-2 of FIG. 5 by placing read requests 720 of FIG. 7 in submission queue 1110-1 of FIG. 11C, which may be delivered to KV-SSDs 520-1 and/or 520-2 of FIG. 5 over port 810 of FIG. 8. At block 1355, cache namespace 1020-1 of FIG. 11C may receive results 730 of FIG. 7 from KV-SSDs 520-1 and/or 520-2 of FIG. 5: results 730 of FIG. 7 may be received via completion queue 1120-2 of FIG. 11C over port 810 of FIG. 8. At block 1360, SPU 510-1 of FIG. 11C (and cache manager 1115 of FIG. 11C) may reassemble the data from portions received from KV-SSDs 520-1 and/or 520-2 of FIG. 5. Obviously, if the data is received in its entirety from a KV-SSD, then there is no need to reassemble the data: block 1360 may therefore be omitted as shown by dashed line 1365. Processing may then return to block 1320 of FIG. 13A to complete delivery of the requested data to processor 205 of FIG. 5.

Note that it may occur that cache SSDs 505-1 and/or 505-2 of FIG. 5 have some of the data, but not necessarily all of the data, requested in read request 705 of FIG. 7. For example, the data might span more than one "cache line" within cache SSDs 505-1 and/or 505-2 of FIG. 5: if one "cache line" is evicted but another is not, the data may be partially stored in cache SSDs 505-1 and 505-2 of FIG. 5. (Of course, as cache SSDs 505-1 and 505-2 of FIG. 5 may be SSDs themselves, the data stored thereon may not be organized into cache lines as that term is conventionally used, but the approach is similar.) In such situations, cache namespace 1020-1 of FIG. 11C may be able to determine which data is stored on cache SSDs 505-1 and 505-2 of FIG. 5 and what data is not stored on cache SSDs 505-1 and 505-2 of FIG. 5 and send read requests 720 of FIG. 7 to retrieve only the missing data. For example, cache namespace 1020-1 may determine what portions of the data are stored on cache SSDs 505-1 and 505-2 of FIG. 5, identify the portions of the data that are missing, identify which KV-SSDs store the missing portions, request those missing portions, and reassemble the data from both the data stored on cache SSDs 505-1 and 505-2 of FIG. 5 and the data received from KV-SSDs 520-1 and/or 520-2 of FIG. 5.

In FIGS. 12A-13B, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

Embodiments of the inventive concept offer technical advantages over the prior art. In conventional systems, between executing applications, managing the operating system and file system, and controlling devices such as storage devices, the burden on the local processor may be high. Embodiments of the inventive concept may shift the burden off the local processor without introducing new bottlenecks in other parts of the system (such as another processor or memory). In addition, embodiments of the inventive concept may permit data to be stored using a storage methodology without the local processor being aware of the actual storage methodology. Thus, for example, the local processor may send data read and write requests using a block-based approach even though the actual storage devices may use a Key-Value storage system.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

The various operations of methods described above may be performed by any suitable means capable of performing the operations, such as various hardware and/or software component(s), circuits, and/or module(s). The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a Solid State Drive (SSD), comprising:
    a first port to receive first read requests and first write requests from a host;
    a second port to send second read requests and second write requests to a second storage device;
    flash storage for data; and
    an SSD controller to process the first read requests to generate the second read requests and to process the first write requests to generate the second write requests,
    wherein the SSD is used as a cache for data stored on the second storage device.

Statement 2. An embodiment of the inventive concept includes the SSD according to statement 1, wherein:
the first port includes a Peripheral Component Interconnect Express (PCIe) port; and
the second port includes an Ethernet port.

Statement 3. An embodiment of the inventive concept includes the SSD according to statement 1, wherein the second storage device includes a Key-Value SSD (KV-SSD).

Statement 4. An embodiment of the inventive concept includes the SSD according to statement 3, wherein the KV-SSD is remote from the SSD.

Statement 5. An embodiment of the inventive concept includes the SSD according to statement 3, wherein:
the first read requests and the first write requests from the host include PCIe read requests and PCIe write requests from the host; and
the SSD controller is operative to send key-value read requests and key-value write requests to the KV-SSD.

Statement 6. An embodiment of the inventive concept includes the SSD according to statement 1, further comprising a storage-related processing unit (SPU).

Statement 7. An embodiment of the inventive concept includes the SSD according to statement 6, wherein the SPU is operative to manage storage of data on the second storage device.

Statement 8. An embodiment of the inventive concept includes the SSD according to statement 6, wherein the SPU includes at least one of a general purpose processor, a Field Programmable Gate Array (FPGA), an Application-Specific Integrated Circuit (ASIC), a Graphic Processing Unit (GPU), and a General Purpose Graphics Processing Unit (GPGPU).

Statement 9. An embodiment of the inventive concept includes the SSD according to statement 1, further comprising a general data processing unit (DPU).

Statement 10. An embodiment of the inventive concept includes the SSD according to statement 9, wherein the DPU is operative to execute instructions of an application.

Statement 11. An embodiment of the inventive concept includes the SSD according to statement 10, wherein the application is off-loaded from the host.

Statement 12. An embodiment of the inventive concept includes the SSD according to statement 1, wherein the SSD is organized into at least one cache namespace.

Statement 13. An embodiment of the inventive concept includes the SSD according to statement 12, wherein the SSD includes at least one first queue and at least one second queue for the at least one cache namespace.

Statement 14. An embodiment of the inventive concept includes the SSD according to statement 13, wherein the SSD includes the at least one first queue and the at least one second queue for each namespace in the at least one cache namespace.

Statement 15. An embodiment of the inventive concept includes the SSD according to statement 13, wherein:
the at least one first queue includes at least one first submission queue and at least one first completion queue; and
the at least one second queue includes at least one second submission queue and at least one second completion queue.

Statement 16. An embodiment of the inventive concept includes the SSD according to statement 13, wherein:
the at least one first queue is associated with the first port; and
the at least one second queue is associated with the second port.

Statement 17. An embodiment of the inventive concept includes the SSD according to statement 16, wherein the SSD controller is operative to receive the first read requests and the first write requests in the at least one first queue associated with the first port and to send the second read requests and the second write requests using the at least one second queue associated with the second port.

Statement 18. An embodiment of the inventive concept includes the SSD according to statement 13, wherein the at least one cache namespace further includes:
a cache manager to manage requests received via the at least one first queue and to issue requests via the at least one second queue; and
a persistent memory to store data based on the requests.

Statement 19. An embodiment of the inventive concept includes the SSD according to statement 18, wherein the at least one cache namespace further includes a processing unit (PU) buffer for data assembly and disassembly.

Statement 20. An embodiment of the inventive concept includes the SSD according to statement 1, wherein the SSD is operative to respond to the first read requests based at least in part on the data in the flash storage.

Statement 21. An embodiment of the inventive concept includes the SSD according to statement 1, wherein the SSD is operative to respond to the first write requests based at least in part on the data in the flash storage.

Statement 22. An embodiment of the inventive concept includes the SSD according to statement 1, wherein the SSD controller is operative to send the second read requests and the second write requests to a plurality of second storage devices.

Statement 23. An embodiment of the inventive concept includes the SSD according to statement 22, wherein the SSD controller manages erasure coding of the second read requests and the second write requests on the plurality of second storage device.

Statement 24. An embodiment of the inventive concept includes a system, comprising:
a processor executing an operating system;
a memory storing data for the operating system;
a cache SSD, including:
a first port to receive first read requests and first write requests from the processor;
a second port to send second read requests and second write requests to a second storage device;
flash storage for data; and
an SSD controller to process the first read requests to generate the second read requests and to process the first write requests to generate the second write requests, and the second storage device,
wherein the SSD is used as a cache for data stored on the second storage device.

Statement 25. An embodiment of the inventive concept includes the system according to statement 24, wherein the second storage device includes a Key-Value SSD (KV-SSD).

Statement 26. An embodiment of the inventive concept includes the system according to statement 25, wherein the KV-SSD is remote from the SSD.

Statement 27. An embodiment of the inventive concept includes the system according to statement 25, wherein:
the first read requests and the first write requests from the host include PCIe read requests and PCIe write requests from the host; and
the SSD controller is operative to send key-value read requests and key-value write requests to the KV-SSD.

Statement 28. An embodiment of the inventive concept includes the system according to statement 25, wherein the KV-SSD includes an SPU to manage storage of data on the KV-SSD.

Statement 29. An embodiment of the inventive concept includes the system according to statement 24, wherein the cache SSD further includes a storage-related processing unit (SPU).

Statement 30. An embodiment of the inventive concept includes the system according to statement 29, wherein the SPU is operative to manage storage of data on the second storage device.

Statement 31. An embodiment of the inventive concept includes the system according to statement 30, wherein the SPU is operative to perform an acceleration function on the data on the second storage device.

Statement 32. An embodiment of the inventive concept includes the system according to statement 31, wherein the acceleration function is at least one of encryption, compression, decryption, or decompression.

Statement 33. An embodiment of the inventive concept includes the system according to statement 29, wherein the SPU includes at least one of a general purpose processor, a Field Programmable Gate Array (FPGA), an Application-Specific Integrated Circuit (ASIC), a Graphic Processing Unit (GPU), and a General Purpose Graphics Processing Unit (GPGPU).

Statement 34. An embodiment of the inventive concept includes the system according to statement 24, wherein the SSD controller is operative to send the second read requests and the second write requests to a plurality of second storage devices.

Statement 35. An embodiment of the inventive concept includes the system according to statement 24, further comprising a general data processing unit (DPU).

Statement 36. An embodiment of the inventive concept includes a method comprising:
 receiving a first write request for a data from a host at a Solid State Drive (SSD) over a first port of the SSD;
 sending a second write request for the data from the SSD to a second storage device over a second port of the SSD; and
 receiving a write result from the second storage device at the SSD over the second port of the SSD; and
 sending the write result from the SSD to the host over the first port of the SSD.

Statement 37. An embodiment of the inventive concept includes the method according to statement 36, wherein
 receiving a first write request for a data from a host at a Solid State Drive (SSD) over a first port of the SSD includes receiving the first write request for the data from the host at the SSD via a first queue over the first port of the SSD; and
 sending the write result from the SSD to the host over the first port of the SSD includes sending the write result from the SSD to the host via the first queue over the first port of the SSD.

Statement 38. An embodiment of the inventive concept includes the method according to statement 37, wherein the first queue includes queue pair including a first submission queue and a first completion queue.

Statement 39. An embodiment of the inventive concept includes the method according to statement 36, wherein:
 sending a second write request for the data from the SSD to a second storage device over a second port of the SSD includes sending the second write request for the data from the SSD to the second storage device via a second queue over the second port of the SSD; and
 receiving a write result from the second storage device at the SSD over the second port of the SSD includes receiving the write result from the second storage device at the SSD via the second queue over the second port of the SSD.

Statement 40. An embodiment of the inventive concept includes the method according to statement 39, wherein the second queue includes queue pair including a second submission queue and a second completion queue.

Statement 41. An embodiment of the inventive concept includes the method according to statement 36, wherein sending a second write request for the data from the SSD to a second storage device over a second port of the SSD includes sending the second write request for the data from the SSD to a plurality of second storage devices over the second port of the SSD.

Statement 42. An embodiment of the inventive concept includes the method according to statement 41, wherein sending the second write request for the data from the SSD to a plurality of second storage devices over the second port of the SSD includes:
 disassembling the data into at least two portions of the data; and
 sending a portion of the data from the SSD to one of the plurality of second storage devices over the second port of the SSD.

Statement 43. An embodiment of the inventive concept includes the method according to statement 42, wherein sending the second write request for the data from the SSD to a plurality of second storage devices over the second port of the SSD further includes identifying the one of the plurality of second storage devices using a SPU before sending the portion of the data from the SSD to one of the plurality of second storage devices over the second port of the SSD.

Statement 44. An embodiment of the inventive concept includes the method according to statement 42, wherein disassembling the data into at least two portions of the data includes disassembling the data into at least two portions of the data using a storage processing unit (SPU).

Statement 45. An embodiment of the inventive concept includes the method according to statement 41, wherein receiving the write result from the second storage device at the SSD over the second port of the SSD includes receiving the write result from the plurality of second storage devices at the SSD over the second port of the SSD.

Statement 46. An embodiment of the inventive concept includes the method according to statement 36, further comprising applying an acceleration function to the data before sending the second write request for the data from the SSD to the second storage device over the second port of the SSD.

Statement 47. An embodiment of the inventive concept includes the method according to statement 46, wherein applying an acceleration function to the data before sending the second write request for the data from the SSD to the second storage device over the second port of the SSD includes applying the acceleration function to the data using a general Data Processing Unit (DPU) before sending the second write request for the data from the SSD to the second storage device over the second port of the SSD.

Statement 48. An embodiment of the inventive concept includes the method according to statement 36, further comprising storing the data in a flash storage of the SSD.

Statement 49. An embodiment of the inventive concept includes the method according to statement 48, further comprising sending the write result from the SSD to the host over the first port of the SSD before receiving the write result from the second storage device at the SSD over the second port of the SSD.

Statement 50. An embodiment of the inventive concept includes the method according to statement 36, wherein:
sending a second write request for the data from the SSD to a second storage device over a second port of the SSD sending a Key-Value (KV) write request for the data from the SSD to a Key-Value SSD (KV-SSD) over the second port of the SSD; and
receiving a write result from the second storage device at the SSD over the second port of the SSD includes receiving the write result from the KV-SSD at the SSD over the second port of the SSD; and Statement 51. An embodiment of the inventive concept includes the method according to statement 50, further comprising generating the KV write request from the first write request.

Statement 52. An embodiment of the inventive concept includes a method, comprising:
receiving a first read request for a data from a host at a Solid State Drive (SSD) over a first port of the SSD;
determining whether the data is stored in a flash storage of the SSD;
based at least in part on the data not being stored in the flash storage of the SSD:
sending a second read request for the data from the SSD to a second storage device over a second port of the SSD; and
receiving the data from the second storage device at the SSD over the second port of the SSD; and
sending the data from the SSD to the host over the first port of the SSD.

Statement 53. An embodiment of the inventive concept includes the method according to statement 52, wherein
receiving a first read request for a data from a host at a Solid State Drive (SSD) over a first port of the SSD includes receiving the first read request for the data from the host at the SSD via a first queue over the first port of the SSD; and
sending the data from the SSD to the host over the first port of the SSD includes sending the data from the SSD to the host via the first queue over the first port of the SSD.

Statement 54. An embodiment of the inventive concept includes the method according to statement 53, wherein the first queue includes queue pair including a first submission queue and a first completion queue.

Statement 55. An embodiment of the inventive concept includes the method according to statement 52, wherein:
sending a second read request for the data from the SSD to a second storage device over a second port of the SSD includes sending the second read request for the data from the SSD to the second storage device via a second queue over the second port of the SSD; and
receiving the data from the second storage device at the SSD over the second port of the SSD includes receiving the data from the second storage device at the SSD via the second queue over the second port of the SSD.

Statement 56. An embodiment of the inventive concept includes the method according to statement 55, wherein the second queue includes queue pair including a second submission queue and a second completion queue.

Statement 57. An embodiment of the inventive concept includes the method according to statement 52, wherein sending a second read request for the data from the SSD to a second storage device over a second port of the SSD includes sending the second read request for the data from the SSD to a plurality of second storage devices over the second port of the SSD.

Statement 58. An embodiment of the inventive concept includes the method according to statement 57, wherein receiving the data from the second storage device at the SSD over the second port of the SSD includes receiving the data from the plurality of second storage devices at the SSD over the second port of the SSD.

Statement 59. An embodiment of the inventive concept includes the method according to statement 58, wherein receiving the data from the plurality of second storage devices at the SSD over the second port of the SSD includes:
receiving at least two portions of the data from the plurality of second storage devices at the SSD over the second port of the SSD; and
reassembling the data from the at least two portions of the data.

Statement 60. An embodiment of the inventive concept includes the method according to statement 59, wherein reassembling the data from the at least two portions of the data includes reassembling the data from the at least two portions of the data using a storage processing unit (SPU).

Statement 61. An embodiment of the inventive concept includes the method according to statement 57, further comprising identifying the plurality of second storage devices using a SPU before sending the second read request for the data from the SSD to the plurality of second storage devices over the second port of the SSD.

Statement 62. An embodiment of the inventive concept includes the method according to statement 52, further comprising applying an acceleration function to the data before sending the data from the SSD to the host over the first port of the SSD.

Statement 63. An embodiment of the inventive concept includes the method according to statement 62, wherein applying an acceleration function to the data before sending the data from the SSD to the host over the first port of the SSD includes applying the acceleration function to the data using a general Data Processing Unit (DPU) before sending the data from the SSD to the host over the first port of the SSD.

Statement 64. An embodiment of the inventive concept includes the method according to statement 52, further comprising, based at least in part on the data being stored in the flash storage of the SSD, reading the data from the flash storage of the SSD.

Statement 65. An embodiment of the inventive concept includes the method according to statement 52, wherein:
sending a second read request for the data from the SSD to a second storage device over a second port of the SSD includes sending a Key-Value (KV) read request for the data from the SSD to a Key-Value SSD (KV-SSD) over the second port of the SSD; and
receiving the data from the second storage device at the SSD over the second port of the SSD includes receiving the data from the KV-SSD at the SSD over the second port of the SSD.

Statement 66. An embodiment of the inventive concept includes the method according to statement 65, further comprising generating the KV read request from the first read request.

Statement 67. An embodiment of the inventive concept includes an article, comprising a non-transitory storage medium, the non-transitory storage medium having stored thereon instructions that, when executed by a machine, result in:
  receiving a first write request for a data from a host at a Solid State Drive (SSD) over a first port of the SSD;
  sending a second write request for the data from the SSD to a second storage device over a second port of the SSD; and
  receiving a write result from the second storage device at the SSD over the second port of the SSD; and
  sending the write result from the SSD to the host over the first port of the SSD.

Statement 68. An embodiment of the inventive concept includes the article according to statement 67, wherein
  receiving a first write request for a data from a host at a Solid State Drive (SSD) over a first port of the SSD includes receiving the first write request for the data from the host at the SSD via a first queue over the first port of the SSD; and
  sending the write result from the SSD to the host over the first port of the SSD includes sending the write result from the SSD to the host via the first queue over the first port of the SSD.

Statement 69. An embodiment of the inventive concept includes the article according to statement 68, wherein the first queue includes queue pair including a first submission queue and a first completion queue.

Statement 70. An embodiment of the inventive concept includes the article according to statement 67, wherein:
  sending a second write request for the data from the SSD to a second storage device over a second port of the SSD includes sending the second write request for the data from the SSD to the second storage device via a second queue over the second port of the SSD; and
  receiving a write result from the second storage device at the SSD over the second port of the SSD includes receiving the write result from the second storage device at the SSD via the second queue over the second port of the SSD.

Statement 71. An embodiment of the inventive concept includes the article according to statement 70, wherein the second queue includes queue pair including a second submission queue and a second completion queue.

Statement 72. An embodiment of the inventive concept includes the article according to statement 67, wherein sending a second write request for the data from the SSD to a second storage device over a second port of the SSD includes sending the second write request for the data from the SSD to a plurality of second storage devices over the second port of the SSD.

Statement 73. An embodiment of the inventive concept includes the article according to statement 72, wherein sending the second write request for the data from the SSD to a plurality of second storage devices over the second port of the SSD includes:
  disassembling the data into at least two portions of the data; and
  sending a portion of the data from the SSD to one of the plurality of second storage devices over the second port of the SSD.

Statement 74. An embodiment of the inventive concept includes the article according to statement 73, wherein sending the second write request for the data from the SSD to a plurality of second storage devices over the second port of the SSD further includes identifying the one of the plurality of second storage devices using a SPU before sending the portion of the data from the SSD to one of the plurality of second storage devices over the second port of the SSD.

Statement 75. An embodiment of the inventive concept includes the article according to statement 73, wherein disassembling the data into at least two portions of the data includes disassembling the data into at least two portions of the data using a storage processing unit (SPU).

Statement 76. An embodiment of the inventive concept includes the article according to statement 72, wherein receiving the write result from the second storage device at the SSD over the second port of the SSD includes receiving the write result from the plurality of second storage devices at the SSD over the second port of the SSD.

Statement 77. An embodiment of the inventive concept includes the article according to statement 67, the non-transitory storage medium having stored thereon further instructions that, when executed by the machine, result in applying an acceleration function to the data before sending the second write request for the data from the SSD to the second storage device over the second port of the SSD.

Statement 78. An embodiment of the inventive concept includes the article according to statement 77, wherein applying an acceleration function to the data before sending the second write request for the data from the SSD to the second storage device over the second port of the SSD includes applying the acceleration function to the data using a general Data Processing Unit (DPU) before sending the second write request for the data from the SSD to the second storage device over the second port of the SSD.

Statement 79. An embodiment of the inventive concept includes the article according to statement 67, the non-transitory storage medium having stored thereon further instructions that, when executed by the machine, result in storing the data in a flash storage of the SSD.

Statement 80. An embodiment of the inventive concept includes the article according to statement 79, the non-transitory storage medium having stored thereon further instructions that, when executed by the machine, result in sending the write result from the SSD to the host over the first port of the SSD before receiving the write result from the second storage device at the SSD over the second port of the SSD.

Statement 81. An embodiment of the inventive concept includes the article according to statement 67, wherein:
  sending a second write request for the data from the SSD to a second storage device over a second port of the SSD sending a Key-Value (KV) write request for the data from the SSD to a Key-Value SSD (KV-SSD) over the second port of the SSD; and
  receiving a write result from the second storage device at the SSD over the second port of the SSD includes receiving the write result from the KV-SSD at the SSD over the second port of the SSD; and Statement 82. An embodiment of the inventive concept includes the article according to statement 81, the non-transitory storage medium having stored thereon further instructions that, when executed by the machine, result in generating the KV write request from the first write request.

Statement 83. An embodiment of the inventive concept includes an article, comprising a non-transitory storage medium, the non-transitory storage medium having stored thereon instructions that, when executed by a machine, result in:
  receiving a first read request for a data from a host at a Solid State Drive (SSD) over a first port of the SSD;

determining whether the data is stored in a flash storage of the SSD;
based at least in part on the data not being stored in the flash storage of the SSD:
sending a second read request for the data from the SSD to a second storage device over a second port of the SSD; and
receiving the data from the second storage device at the SSD over the second port of the SSD; and
sending the data from the SSD to the host over the first port of the SSD.

Statement 84. An embodiment of the inventive concept includes the article according to statement 83, wherein
receiving a first read request for a data from a host at a Solid State Drive (SSD) over a first port of the SSD includes receiving the first read request for the data from the host at the SSD via a first queue over the first port of the SSD; and
sending the data from the SSD to the host over the first port of the SSD includes sending the data from the SSD to the host via the first queue over the first port of the SSD.

Statement 85. An embodiment of the inventive concept includes the article according to statement 84, wherein the first queue includes queue pair including a first submission queue and a first completion queue.

Statement 86. An embodiment of the inventive concept includes the article according to statement 83, wherein:
sending a second read request for the data from the SSD to a second storage device over a second port of the SSD includes sending the second read request for the data from the SSD to the second storage device via a second queue over the second port of the SSD; and
receiving the data from the second storage device at the SSD over the second port of the SSD includes receiving the data from the second storage device at the SSD via the second queue over the second port of the SSD.

Statement 87. An embodiment of the inventive concept includes the article according to statement 86, wherein the second queue includes queue pair including a second submission queue and a second completion queue.

Statement 88. An embodiment of the inventive concept includes the article according to statement 83, wherein sending a second read request for the data from the SSD to a second storage device over a second port of the SSD includes sending the second read request for the data from the SSD to a plurality of second storage devices over the second port of the SSD.

Statement 89. An embodiment of the inventive concept includes the article according to statement 88, wherein receiving the data from the second storage device at the SSD over the second port of the SSD includes receiving the data from the plurality of second storage devices at the SSD over the second port of the SSD.

Statement 90. An embodiment of the inventive concept includes the article according to statement 89, wherein receiving the data from the plurality of second storage devices at the SSD over the second port of the SSD includes:
receiving at least two portions of the data from the plurality of second storage devices at the SSD over the second port of the SSD; and
reassembling the data from the at least two portions of the data.

Statement 91. An embodiment of the inventive concept includes the article according to statement 90, wherein reassembling the data from the at least two portions of the data includes reassembling the data from the at least two portions of the data using a storage processing unit (SPU).

Statement 92. An embodiment of the inventive concept includes the article according to statement 88, the non-transitory storage medium having stored thereon further instructions that, when executed by the machine, result in identifying the plurality of second storage devices using a SPU before sending the second read request for the data from the SSD to the plurality of second storage devices over the second port of the SSD.

Statement 93. An embodiment of the inventive concept includes the article according to statement 83, the non-transitory storage medium having stored thereon further instructions that, when executed by the machine, result in applying an acceleration function to the data before sending the data from the SSD to the host over the first port of the SSD.

Statement 94. An embodiment of the inventive concept includes the article according to statement 93, wherein applying an acceleration function to the data before sending the data from the SSD to the host over the first port of the SSD includes applying the acceleration function to the data using a general Data Processing Unit (DPU) before sending the data from the SSD to the host over the first port of the SSD.

Statement 95. An embodiment of the inventive concept includes the article according to statement 83, the non-transitory storage medium having stored thereon further instructions that, when executed by the machine, result in, based at least in part on the data being stored in the flash storage of the SSD, reading the data from the flash storage of the SSD.

Statement 96. An embodiment of the inventive concept includes the article according to statement 83, wherein:
sending a second read request for the data from the SSD to a second storage device over a second port of the SSD includes sending a Key-Value (KV) read request for the data from the SSD to a Key-Value SSD (KV-SSD) over the second port of the SSD; and
receiving the data from the second storage device at the SSD over the second port of the SSD includes receiving the data from the KV-SSD at the SSD over the second port of the SSD.

Statement 97. An embodiment of the inventive concept includes the article according to statement 96, the non-transitory storage medium having stored thereon further instructions that, when executed by the machine, result in generating the KV read request from the first read request.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:
1. A device, comprising:
storage media for a data; and
a controller to receive a first request from a host, generate a second request based at least in part on the first request, send the second request to a storage device, receive a response from the storage device, and send the response to the host,
wherein the device includes a cache namespace and a first queue and a second queue for the cache namespace.

2. The device according to claim 1, wherein the device includes:
a Peripheral Component Interconnect Express (PCIe) port; or
an Ethernet port; or
a combination thereof.

3. The device according to claim 1, further comprising a storage-related processing unit (SPU) to manage storage of the data on the storage device.

4. The device according to claim 1, further comprising a general data processing unit (DPU).

5. The device according to claim 1, wherein the cache namespace includes:
a cache manager to manage a third request received via the first queue and to issue a fourth request via the second queue; and
a persistent memory to store the data based on the third request and the fourth request.

6. A device according to claim 1, wherein:
the first request includes a read request;
the response from the storage device includes the data; and
the controller is further configured to store the data in the storage media.

7. A device according to claim 1, wherein:
the response includes the data; and
the controller is further configured to store the data in the storage media.

8. The device according to claim 4, wherein the DPU is configured to execute instructions of an application.

9. The device according to claim 5, wherein the cache namespace further includes a processing unit (PU) buffer for data assembly and disassembly.

10. A device according to claim 7, wherein the controller is further configured to receive a third request from the host and to send a second response based at least in part on the data in the storage media.

11. A method comprising:
receiving a first I/O request for a data from a host at a device using a first queue associated with a cache namespace in the device;
generating a second I/O request based at least in part on the first I/O request;
sending the second I/O request for the data from the device to a storage device using a second queue associated with the cache namespace in the device;
receiving a response from the storage device at the device; and
sending the response from the device to the host.

12. The method according to claim 11, wherein sending the second I/O request for the data from the device to the storage device includes sending the second I/O request for the data from the device to the storage device and a second storage device.

13. The method according to claim 11, wherein:
sending the second I/O request for the data from the device to the storage device includes sending a Key-Value (KV) I/O request for the data from the device to a KV storage device; and
receiving the response from the storage device at the device includes receiving the response from the KV storage device at the device.

14. The method according to claim 11, wherein the first I/O request includes a read request or a write request.

15. The method according to claim 11, further comprising applying an acceleration function to the data based at least in part on receiving the first I/O request for the data from the host at the device.

16. The method according to claim 12, wherein sending the second I/O request for the data from the device to the storage device and the second storage device includes:
disassembling the data into a first portion of the data and a second portion of the data;
sending the first portion of the data from the device to the storage device; and
sending the second portion of the data from the device to the second storage device.

17. The method according to claim 12, wherein receiving a response from the storage device at the device includes:
receiving a first portion of the data at the device from the storage device;
receiving a second portion of the data at the device from the second storage device; and
reassembling the data from the first portion of the data and the second portion of the data.

18. The method according to claim 13, further comprising generating the KV I/O request based at least in part on the first I/O request.

* * * * *